United States Patent
Jeon et al.

(10) Patent No.: US 9,781,728 B2
(45) Date of Patent: Oct. 3, 2017

(54) METHOD AND APPARATUS FOR COORDINATING SCHEDULERS IN A COORDINATED MULTI-POINT COMMUNICATION SYSTEM

(71) Applicant: Samsung Electronics Co. Ltd., Suwon-si, Gyeonggi-do (KR)

(72) Inventors: Younghyun Jeon, Guri-si (KR); Neunghyung Lee, Seongnam-si (KR); Seunghun Jang, Seoul (KR); Chungryul Chang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 643 days.

(21) Appl. No.: 13/783,554

(22) Filed: Mar. 4, 2013

(65) Prior Publication Data
US 2013/0231125 A1    Sep. 5, 2013

(30) Foreign Application Priority Data

Mar. 5, 2012    (KR) .......................... 10-2012-0022322

(51) Int. Cl.
| | |
|---|---|
| *H04W 72/00* | (2009.01) |
| *H04W 72/08* | (2009.01) |
| *H04L 1/00* | (2006.01) |
| *H04L 1/20* | (2006.01) |
| *H04B 7/024* | (2017.01) |

(52) U.S. Cl.
CPC ......... *H04W 72/082* (2013.01); *H04L 1/0026* (2013.01); *H04L 1/20* (2013.01); *H04B 7/024* (2013.01); *H04L 2001/0093* (2013.01)

(58) Field of Classification Search
CPC ...... H04W 72/082; H04L 1/0026; H04L 1/20; H04L 2001/0093; H04B 7/024
See application file for complete search history.

(56) References Cited

U.S. PATENT DOCUMENTS

| | | | | |
|---|---|---|---|---|
| 2010/0267408 | A1* | 10/2010 | Lee et al. ....................... | 455/509 |
| 2010/0309866 | A1* | 12/2010 | Katayama et al. ........... | 370/329 |
| 2011/0317742 | A1* | 12/2011 | Kawahatsu et al. .......... | 375/132 |
| 2012/0052899 | A1* | 3/2012 | Wang et al. ................... | 455/513 |
| 2013/0005376 | A1* | 1/2013 | Shirani-Mehr et al. ...... | 455/509 |

FOREIGN PATENT DOCUMENTS

| | | |
|---|---|---|
| JP | 2010-283632 A | 12/2010 |
| JP | 2011-077964 A | 4/2011 |
| WO | 2010/103728 A1 | 9/2010 |

* cited by examiner

*Primary Examiner* — Keith Fang
(74) *Attorney, Agent, or Firm* — Jefferson IP Law, LLP

(57) ABSTRACT

A method and an apparatus of a coordinator forming a coordinated communication system for enhancing cell edge terminal throughput are provided. The method includes receiving information on Sound Reference Signal (SRS) reception power at a terminal for respective cells of a scheduler belonging to the coordinator from the scheduler, generating terminal distinction information for indicating whether a terminal is a cell edge terminal based on the SRS reception power information or Signal to Interference plus Noise Ratio (SINR) estimated from the SRS reception power information, generating interference relationship information between terminals and cells based on the SRS reception power information or estimated SINR, and transmitting the terminal distinction information and interference relationship information to the scheduler.

14 Claims, 19 Drawing Sheets

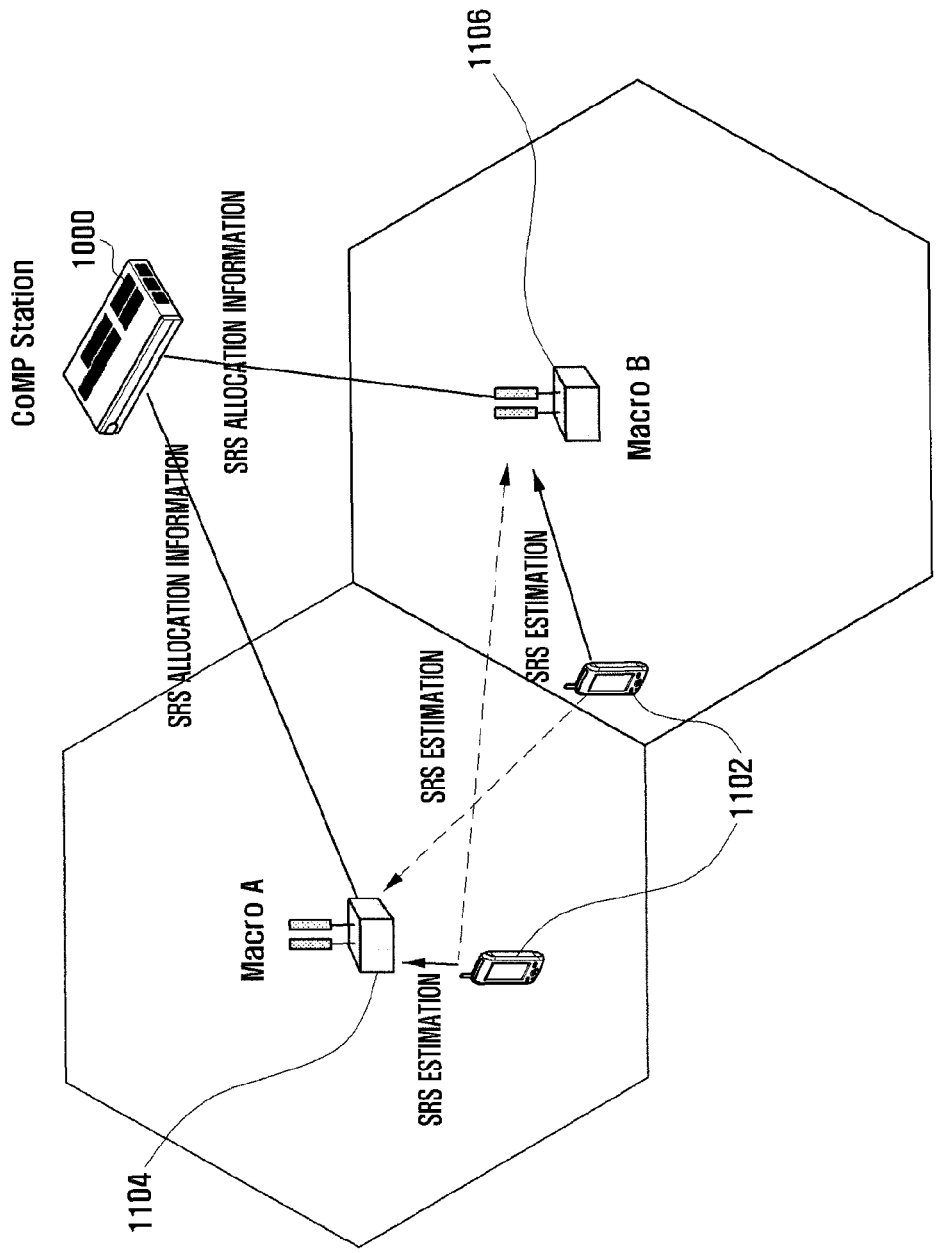

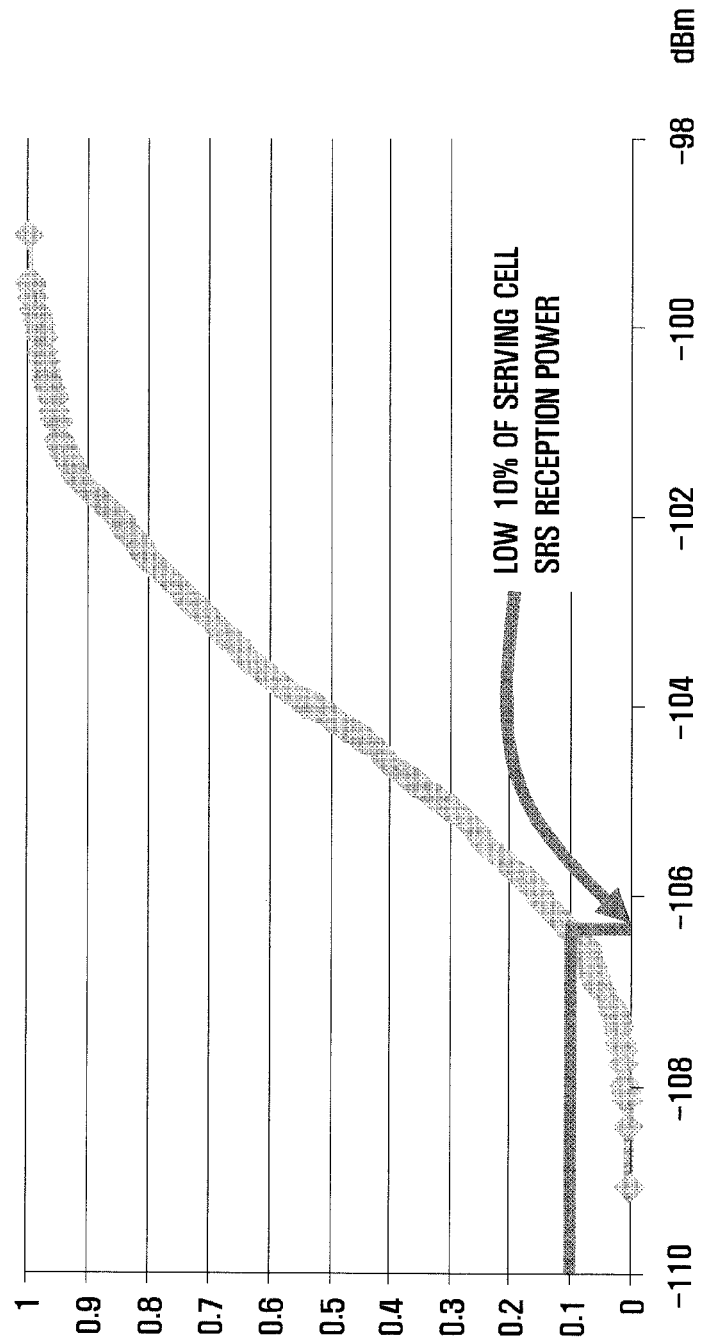

METHOD AND APPARATUS FOR COORDINATING SCHEDULERS IN A COORDINATED MULTI-POINT COMMUNICATION SYSTEM

PRIORITY

This application claims the benefit under 35 U.S.C. §119(a) of a Korean patent application filed on Mar. 5, 2012 in the Korean Intellectual Property Office and assigned Serial No. 10-2012-0022322, the entire disclosure of which is hereby incorporated by reference.

BACKGROUND OF THE INVENTION

1. Field of the Invention

The present invention relates to a coordinated communication method and apparatus. More particularly, the present invention relates to a coordinated communication method for cell edge User Equipment (UE).

2. Description of the Related Art

In a cellular communication environment where adjacent cells are operating on the same frequency, cell-edge users may suffer significant interference. Many techniques have been proposed to reduce inter-cell interference and enhance cell edge capacity. The 3rd Generation Partnership Project (3GPP) Long-Term Evolution (LTE) standard supports Inter-Cell Interference Coordination (ICIC). ICIC is a technique that can effectively reduce inter-cell interference by adjusting the transmit power on the frequency resources in the long-term by taking the traffic and interference to the User Equipment (UE) within the cells. The ICIC technique can be classified into two categories: frequency domain ICIC and time-domain ICIC.

In the frequency domain ICIC, plural evolved Node Bs (eNBs) coordinate transmission power patterns among the cells in the frequency domain such that each eNB performs scheduling by taking notice of the coordinated transmission power pattern to mitigate inter-cell interference. In the time domain ICIC, the plural eNBs coordinate the transmit powers and time resources among the cells in the time domain such that each eNB performs scheduling by taking notice of the coordinated time resources to mitigate inter-cell interference. Partial frequency reuse is a technique that can enhance the cell edge performance by taking the frequency reuse rate and inter-cell interference into consideration. In the partial frequency reuse technique, the subcarriers are grouped into sub-bands such that each cell uses some of the sub-bands to mitigate intra-channel interference. In ICIC, the neighbor cells do not transmit signals on a specific frequency resource or reduce transmit power of the signals on the corresponding frequency resource to mitigate the interference to the UEs at the cell edge area. However, there is a limit in improving the throughput by just mitigating inter-cell interference through resource allocation and transmit power adjustment.

As more advanced ICIC techniques, Coordinated Multipoint (CoMP) Transmission/Reception or Multiple Input Multiple Output (MIMO) takes into consideration of the instantaneous channel of the UE at the cell edge (hereinafter referred to as cell edge UE) and traffic condition. Among various CoMP techniques, Coordinated Scheduling/Coordinated Beamforming (CS/CB) CoMP downlink transmission allows each UE to select antenna beamforming of each Base Station (BS or eNB) to improve the cell edge UE throughput when multiple BSs transmit signals to the UE through antenna beamforming. Each UE selects the antenna beamforming of each BS in the course of maximizing the serving BS signal and minimizing the interference from neighbor eNBs. The CS/CB CoMP BSs transmit data to the UE within their own cells but not to the UE within the neighbor coordinated cell.

In Joint Processing/Transmission (JPT) CoMP, the adjacent eNBs transmit the same information to a cell edge UE simultaneously to enhance the cell edge UE throughput. In order to increase the entire cell throughput, plural eNBs are capable of transmitting the user signals to plural UEs simultaneously. Accordingly, the JP CoMP eNBs transmit data to the UEs within the neighbor CoMP cells as well as the UE within their own cells. CoMP is the technique that is capable of minimizing inter-UE or inter-eNB interferences which maximizes throughput in such a way that logically all eNBs share the channel information between multiple transmit and receive antennas of the multiple eNBs and multiple UEs. The CoMP technique is superior to the ICIC technique in cell edge and cell average throughput. However, the CoMP technique has problems of large information amount exchanged over backhaul and CoMP signal processing complexity.

However, due to achievability issues caused by the distortion of the channel information according to the backhaul overhead and backhaul delay for the channel information exchange, only the Multi User MIMO has been adopted to the LTE release 10. In LTE release 11, the CoMP techniques are under discussion as a study item in view of performance gain and standardization range. There are four CoMP scenarios considered in LTE-Advanced (LTE-A) release 11 according to the LTE communication standard TS 36.912.

FIG. 1 is a diagram illustrating four CoMP scenarios according to the related art.

Referring to FIG. 1, the first scenario 110 is of Intra-eNB CoMP in homogeneous deployment, and the second scenario 130 is of Inter-eNB CoMP in homogeneous deployment. The third scenario 150 is an Inter-cell CoMP in heterogeneous deployment, and the fourth scenario 170 is a Distributed antenna system with shared cell ID.

In the fourth scenario 170, the eNBs share the control channel Physical Downlink Control Channel (PDCCH)/Physical Uplink Control Channel (PUCCH) including CRS or resource allocation information and use the data channel Physical Uplink Shared Channel (PUSCH)/Physical Downlink Shared Channel (PDSCH) in a spatially distributed manner. In this way, it is possible to reduce control channel error rate at the cell edge area and improve the data channel throughput with MIMO and/or Space-Division Multiple Access (SDMA).

The LTE release 8/9 supports the Inter-Cell Interference Control/Coordination (ICIC) as a technique to guarantee the cell edge UE performance.

The downlink ICIC is a proactive technique to guarantee the cell edge UE throughput using Relative Narrowband Transmit Power (RNTP) information with inter-band power information for cell edge UE and inner UE.

FIG. 2 is a diagram illustrating an architecture of radio access systems connected through X2 interfaces according to the related art.

Referring to FIG. 2, the radio access systems are the eNBs 221, 222, and 223. Each eNB forms a cell. For example, the eNB 223 forms the cell 213. The eNBs communicate with each other through X2 interfaces 231, 232, and 233.

In order to perform uplink ICIC, the eNBs 221, 222, and 223 exchange information through X2 interfaces 231, 232, and 233. The information exchanged among the eNBs may include at least one of High Interference Indicator (HII) for the proactive mode and Overload Indicator (OI) for the reactive mode.

HHI is information used in the proactive mode for the eNB 221 to notify the neighbor cells of the high interference to be occurred in advance. Typically, in the power control policies under discussion in the LTE standard, e.g. Fractional Power Control and Transmit Power Control (TPC) Command in PDCCH, the eNB knows the power of the UE. Accordingly, the eNB is able to set the indicator to 0 or 1 based on a certain threshold to UE's transmit power for each Physical Resource Block (PRB). The indicator is set to 0 to indicate low interference, and is set to 1 to indicate high interference. At each ICIC period, the neighbor cells receiving the HII allocate resources to the UE in the course of avoiding collision with the Resource Block (RB) indicated by the HII information. The HII information may be transmitted along with a Target Cell ID. In this case, the target cell for the bit indicating the PRB interference strength level is designated. If the HII with no designation of a specific target cell, this may degrade the scheduling gain.

FIG. 3 is a diagram illustrating an architecture of radio access systems using the OI information according to the related art.

Referring to FIG. 3, the mobile communication system includes a first eNB 310, a second 320, and a third eNB 330. A second cell edge UE 322 is located at the coverage boundaries of the first and second eNBs 310 and 320. A second inner UE 321 is located in the inner zone (far from the boundary) of the second eNB 320. A third cell edge UE 332 is located at the coverage boundary of the first and third eNBs 310 and 330. A third inner UE 331 is located in the inner zone of the third eNB 330.

The first eNB 310 measures the interference strength on each RB and notifies the neighbor cells 320 and 330 of the measurement result using Overload Indicator (OI) through X2 interface. OI is the reactive mode information. The most interference to the first eNB 310 is caused by the cell edge UEs 322 and 332. According to the current LTE standard, the first eNB 310 sets the RB-specific interference level to one of High, Medium, and Low, and notifies the neighbor cells (or eNBs) 320 and 330 of the interference level. An uplink modem measures the thermal noise level No per PRB across the give bandwidth at every ICIC period. The first eNB 310 retains the OI information transmitted most recently to the neighbor cells (or eNBs) 320 and 330 and, if the OI value of the RB has changed, broadcasts the OI information to the neighbor cells (or eNBs) 320 and 330. The Interference over Thermal noise (IoT) control technique for adjusting the powers of the cell edge UEs on the same bandwidth based on the neighbor cell interference measurement can be used to guarantee the cell-specific uplink cell coverage. Like the HII, the OI information of the reactive mode can be used in uplink scheduling.

Although the detailed implementation may be modified somewhat, ICIC is capable of enhancing the cell edge UE performance by basically reflecting the ICIC standard information (HII and OI) based on the interference measurement to the uplink scheduling. However, the HII or IOI information is limited significantly in bit size and does not reflect the uplink channel gain and interference characteristics enough. Accordingly, the ICIC function is restrictive from the viewpoints of both the UE throughput enhancement and entire cell throughput enhancement.

FIG. 4 is a diagram illustrating graphs of long term pilot strength information in downlink and uplink of a system operating in the fourth scenario of FIG. 1 according to the related art.

Referring to FIG. 4, the macro cell A and the RRH A share a cell identifier. Likewise, the macro cell B and the RRH B share a cell identifier.

According to the fourth scenario 170 of Distributed antenna system with shared cell ID, the macro cell and the Remote Radio Head (RRH) use the same cell ID. Accordingly, the Reference Signal Received Power (RSRP) signals of the RRHs overlap at the RRH cell boundary areas. As a consequence, each cell cannot acquire the information, for use in the inter-cell coordinated scheduling by taking notice of uplink interferences among the UEs at RRH cell edge area, from the RSRP signal. This means that the HII-based ICIC scheduling according to the related art can be used for uplink inter-cell coordinated scheduling only for the cell edge UEs located in the macro cell handover area or macro cell edge area due to the uplink scheduling. Accordingly, the UEs located at the boundary between the sub-cells of the RRHs connected to the macro cell A through fiber optic lines suffer significant uplink interference from the viewpoint of uplink.

Without using uplink channel information (SRS), it is impossible to control the inter-UE interference at RRH sub-cell boundary areas or guarantee IoT. Accordingly, the uplink coverage enhancement is restricted. If the number of eNBs per unit area increases through the cell planning without overcoming this drawback, this causes loss in view of Capital Expenditure (CAPEX) and Operation Expense (OPEX).

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a cooperated communication apparatus and method that is capable of improving communication performance of the cell edge UEs efficiently.

In accordance with an aspect of the present invention, a coordinated communication method of a coordinator forming a coordinated communication system is provided. The method includes receiving, from a scheduler belonging to the coordinator, information on Sound Reference Signal (SRS) reception power at a terminal for respective cells of the scheduler, generating terminal distinction information for indicating whether a terminal is a cell edge terminal based on the SRS reception power information or Signal to Interference plus Noise Ratio (SINR) estimated from the SRS reception power information, generating interference relationship information between terminals and cells based on the SRS reception power information or estimated SINR, and transmitting the terminal distinction information and interference relationship information to the scheduler.

In accordance with another aspect of the present invention, a coordinated communication apparatus of a coordinator forming a coordinated communication system is provided. The apparatus includes a receiver which receives, from a scheduler belonging to the coordinator, information on Sound Reference Signal (SRS) reception power at a terminal for respective cells of the scheduler, a controller which generates terminal distinction information for indicating whether a terminal is a cell edge terminal based on the SRS reception power information or Signal to Interference plus Noise Ratio (SINR) estimated from the SRS reception power information and which generates interference relationship information between terminals and cells based on the SRS reception power information or estimated SINR, and a transmitter which transmits the terminal distinction information and interference relationship information to the scheduler.

In accordance with another aspect of the present invention, a communication method of a Coordinated Multi-Point (CoMP) coordinator forming a coordinated communication system is provided. The method includes receiving, from a coordinator of an evolved Node B (eNB), information on Sound Reference Signal (SRS) reception powers at a terminal for respective cells of the scheduler belonging to the coordinator, generating terminal distinction information for indicating whether a terminal is a cell edge terminal based on the SRS reception power information or Signal to Interference plus Noise Ratio (SINR) estimated from the SRS reception power information, generating interference relationship information between terminals and cells based on the SRS reception power information or estimated SINR, and transmitting the terminal distinction information and interference relationship information to the coordinator of the eNB.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 11A and 11B are diagrams illustrating an SRS reception power information transmission procedure of a coordinated communication method according to an exemplary embodiment of the present invention;

FIG. 12B is a graph illustrating a principle of configuring a threshold value for determining inter-coordinator cell edge UE in a coordinated communication method according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
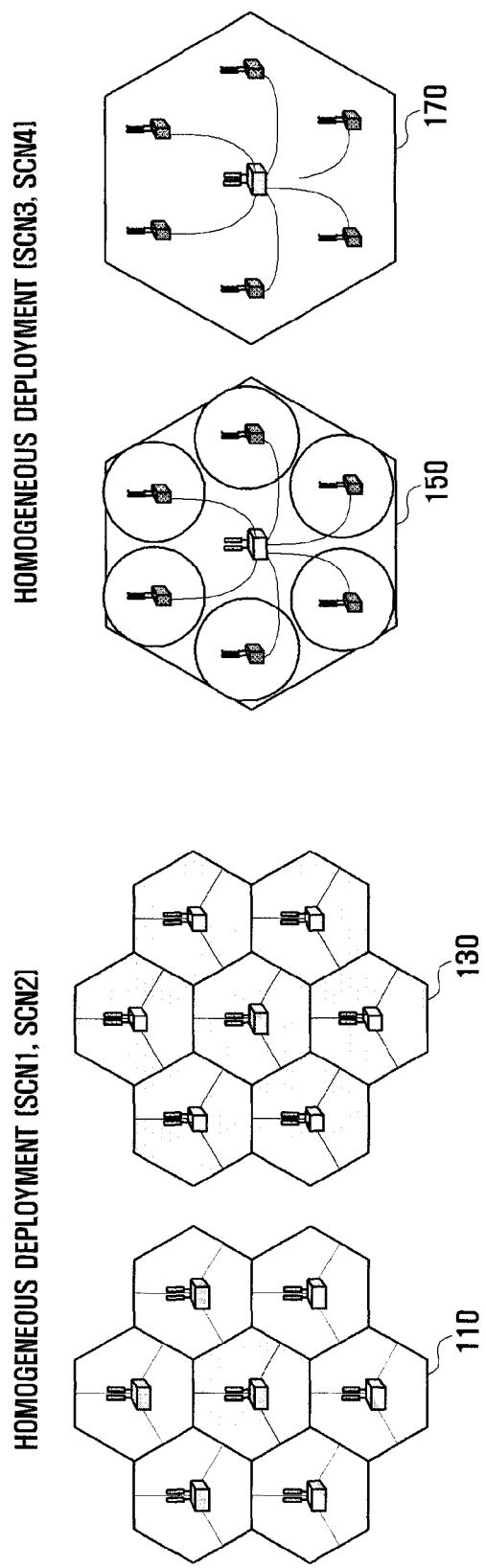
FIG. 1 is a diagram illustrating four Coordinated Multi-Point (CoMP) scenarios according to the related art.
Figure 2:
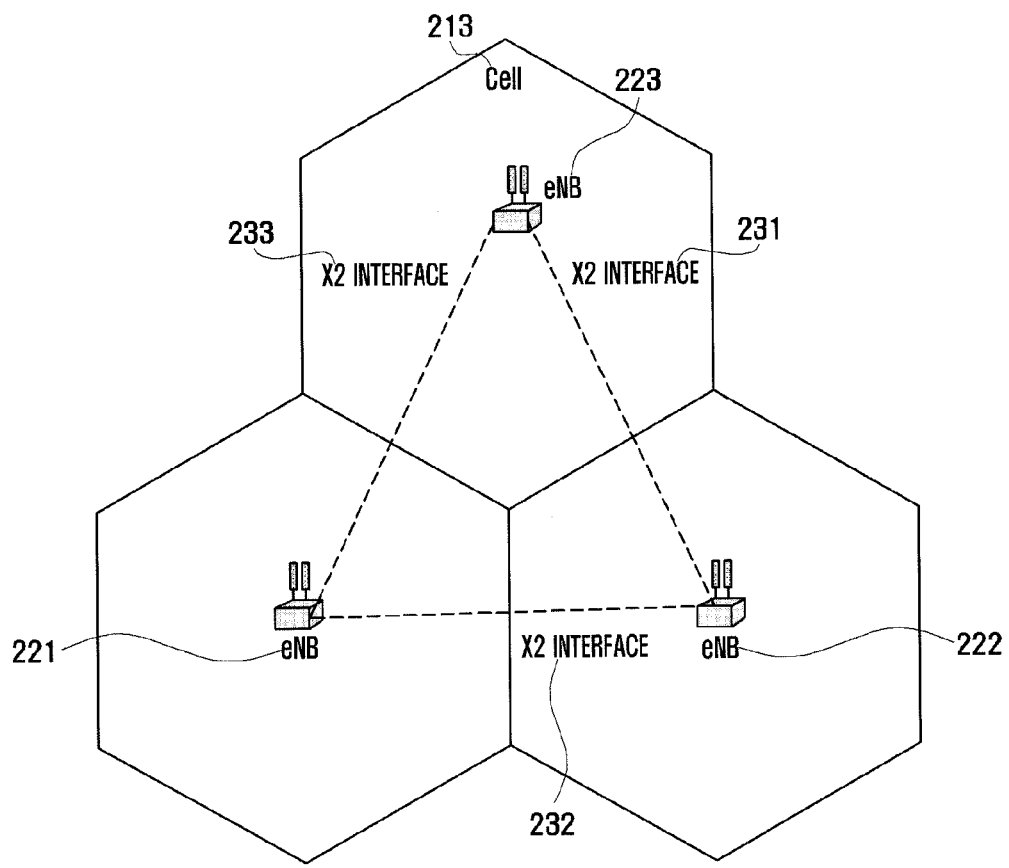
FIG. 2 is a diagram illustrating an architecture of radio access systems connected through X2 interfaces according to the related art.
Figure 3:
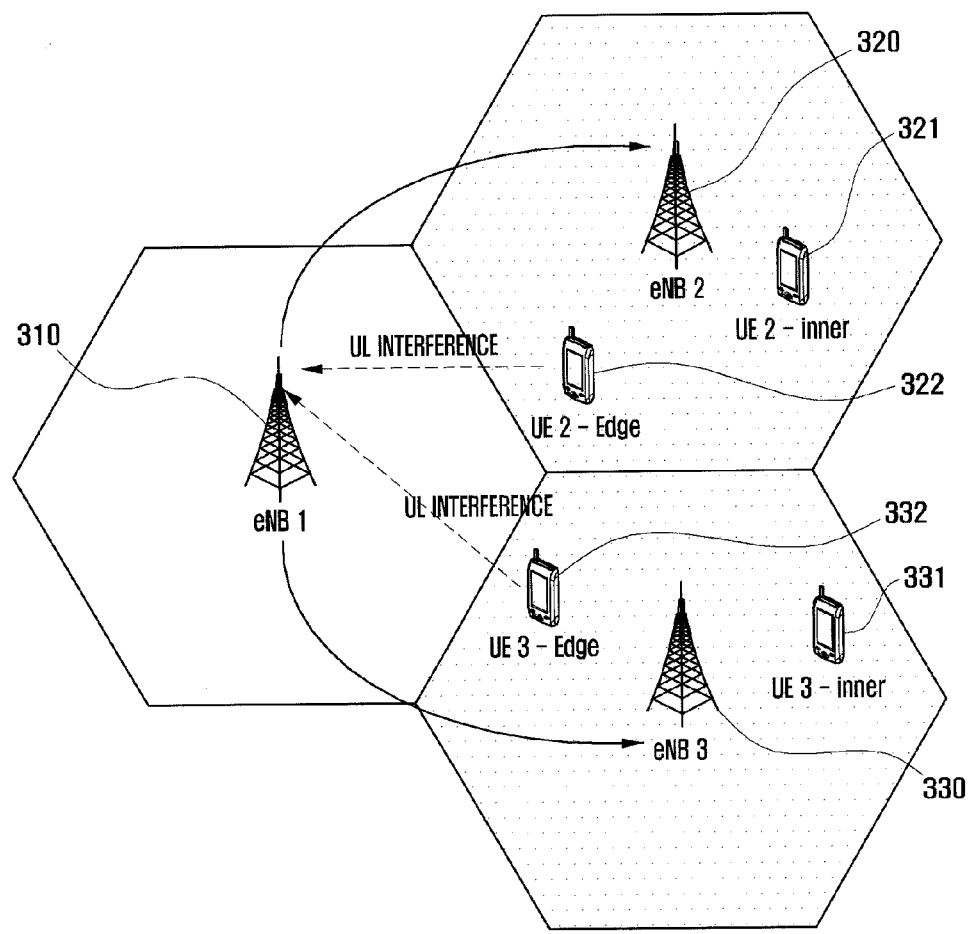
FIG. 3 is a diagram illustrating an architecture of radio access systems using the OI information according to the related art.
Figure 4:
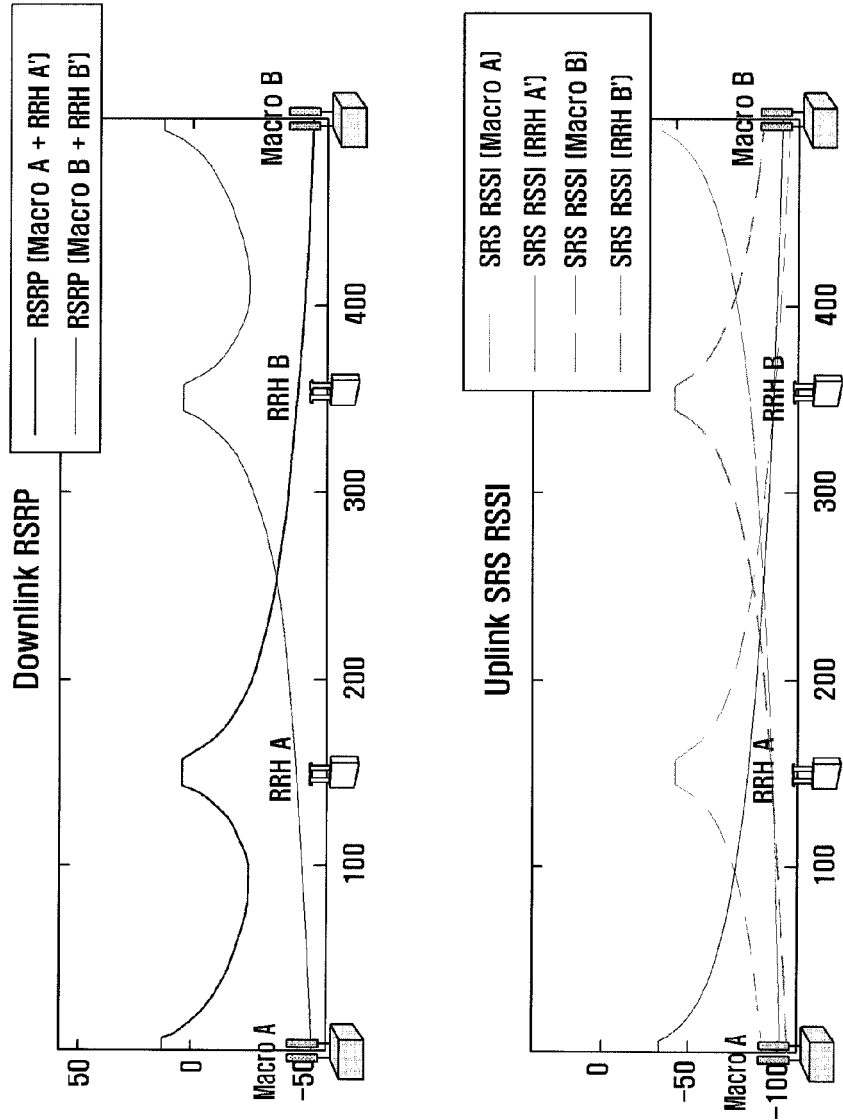
FIG. 4 is a diagram illustrating graphs of long term pilot strength information in downlink and uplink of a system operating in the fourth scenario of FIG. 1 according to the related art.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some elements shown herein may be exaggerated, omitted, or simplified in the drawings, and the elements may have sizes and/or shapes different from those shown in drawings, in practice. The same reference numbers are used throughout the drawings to refer to the same or like parts.

Hereinafter, an apparatus and method according to exemplary embodiments of the present invention are described with reference to accompanying drawings.

Figure 5A:
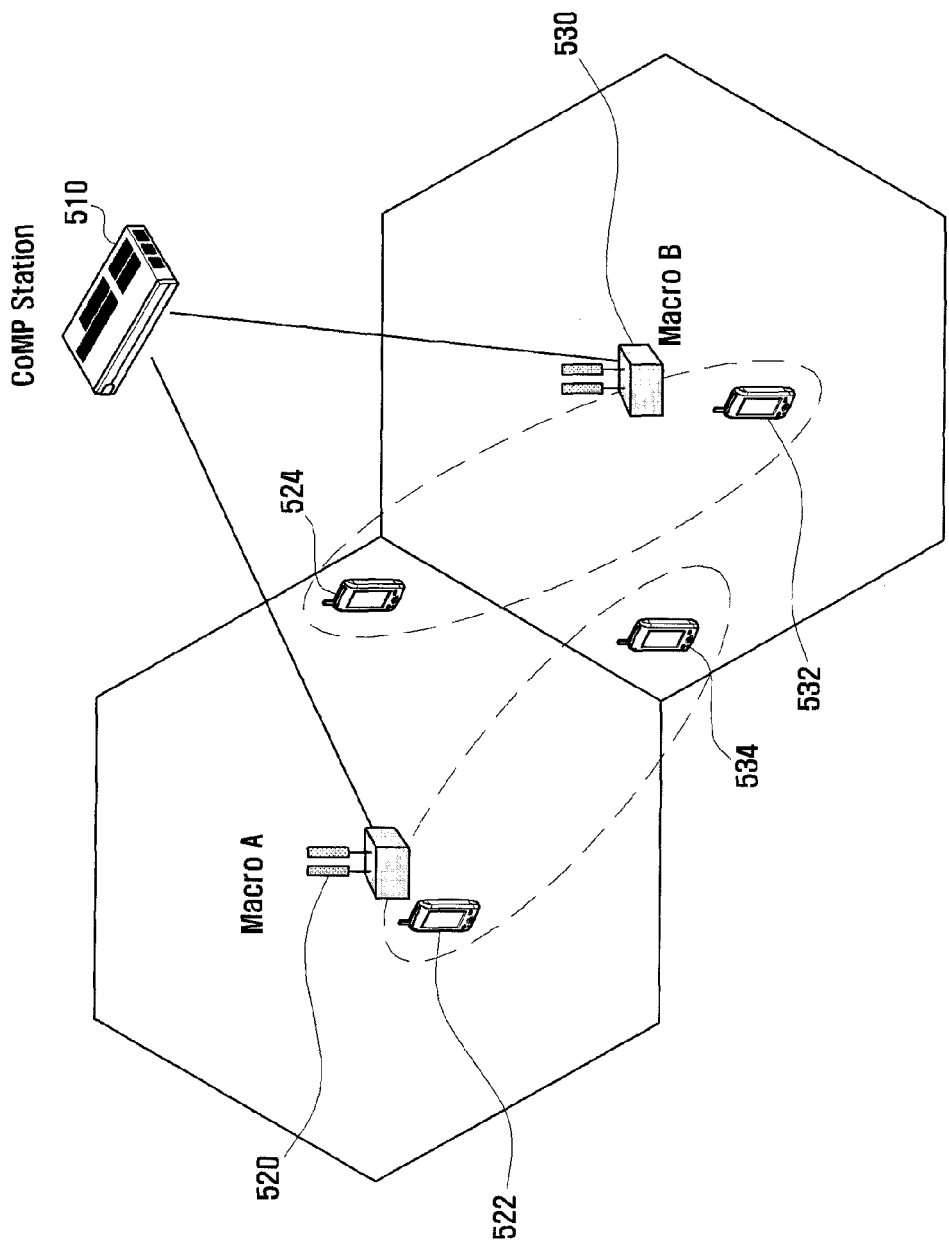
FIG. 5A is a diagram illustrating an architecture of a mobile communication system supporting macro cell CoMP Coordinated Scheduling (CS) according to an exemplary embodiment of the present invention.

FIG. 5A is a diagram illustrating an architecture of a mobile communication system supporting the macro cell Coordinated Multi-Point (CoMP) Coordinated Scheduling (CS) according to an exemplary embodiment of the present invention.

Referring to FIG. 5A, the mobile communication system includes a CoMP station 510, a macro cell A 520, and a macro cell B 530. The CoMP station 510 communicates with the macro cell A 520 and the macro cell B 530. The macro cell A 520 has an inner UE 522 and a cell edge UE 524. The macro cell B 530 has an inner UE 532 and a cell edge UE 534. The UEs 522, 524, 532, and 534 may cause interference with each other. The CoMP station 510 collects information about the UEs 522, 524, 532, and 534 and the macro cells 520 and 530, and sends the macro cells 520 and 530 the information or command for controlling resource allocation such that the macro cells 520 and 530 perform CoMP CS. For the CoMP CS, the cell edge UE 524 of the macro cell A 520 and the inner UE 532 of the macro cell B 530 may be allocated the same time-frequency resource (first resource). In this case, the two UEs 524 and 532 are paired. Likewise, the inner UE 522 of the macro cell A 520 and the cell edge UE 534 of the macro cell B 530 may be allocated the same time-frequency resource (second resource) for the CoMP CS. In this case, the two UEs 522 and 534 are paired. Here, the first and second resources are different resources. The CoMP station 510 is capable of controlling resource allocation in the course of reducing interference between the paired UEs.

In the case of applying exemplary embodiments of the present invention to the CoMP scenarios 1 and 2, it is expected to extend the uplink coverage and uplink capacity of the macro cell. In addition, the reduction of IoT of the cell edge UE at the macro cell boundary area extends uplink coverage, and the adjacent macro cell UE pairing improves the network efficiency and uplink capacity.

Figure 5B:
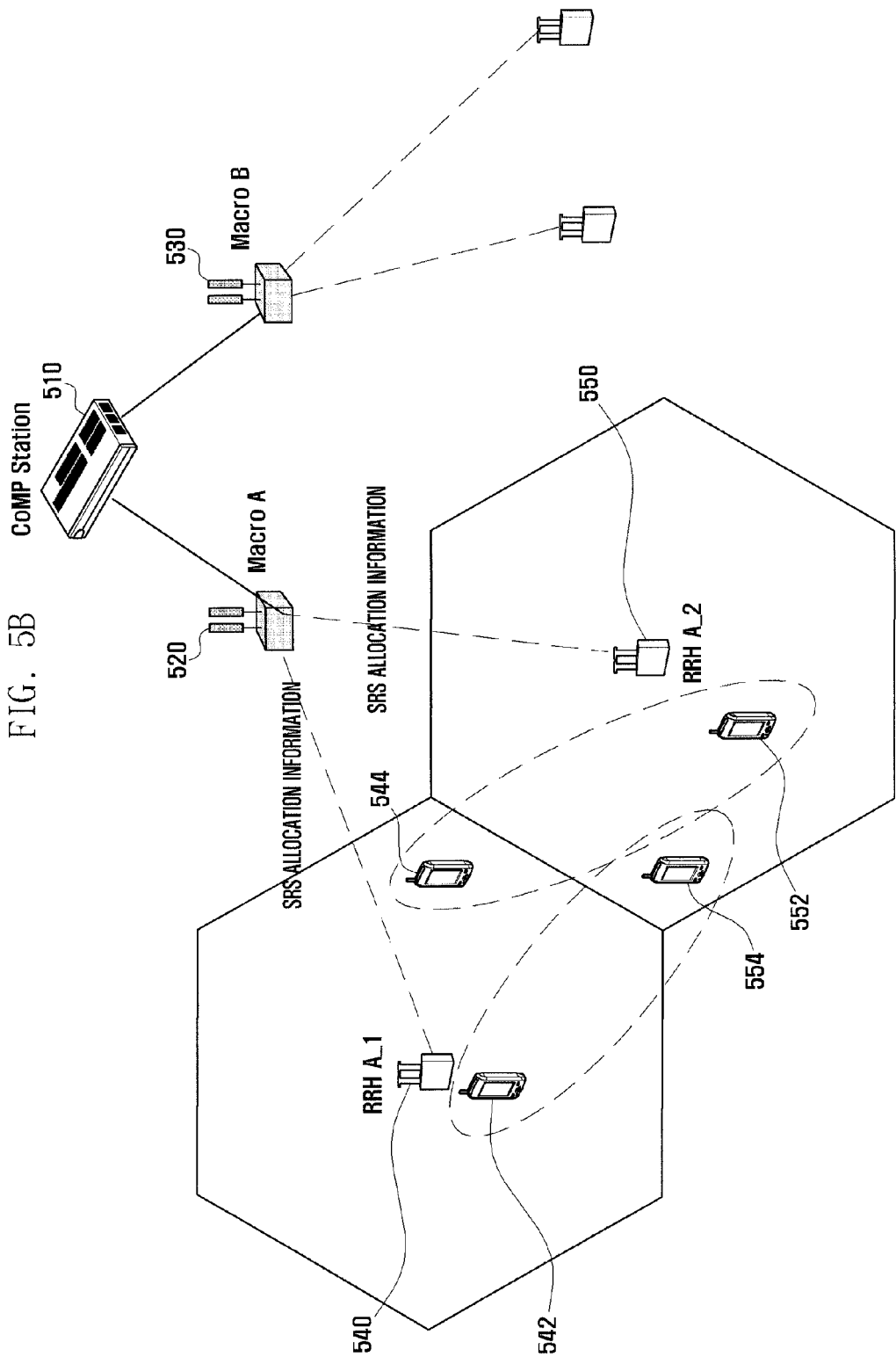
FIG. 5B is a diagram illustrating an architecture of mobile communication system supporting macro cell CoMP CS according to an exemplary embodiment of the present invention.

FIG. 5B is a diagram illustrating the principle of UE pairing for CoMP CS or RRH or sub-cells according to an exemplary embodiment of the present invention.

Referring to FIG. 5B, the mobile communication system includes a CoMP station 510, a macro cell A 520, and a macro cell B 530. The CoMP station 510 communicates with the macro cell A 520 and the macro cell B 530. The macro cell A 520 communicates with RRH A_1 540 and RRH A_2 550. The coverage of the macro cell A 520 includes the coverage of the RRH A_1 540 and the coverage of the RRH A_2 550. The RRH A_1 540 has an inner UE 542 and a cell edge UE 544 within its coverage. The RRH A_2 550 has an inner UE 552 and a cell edge UE 554 within its coverage. The UEs 542, 544, 552, and 554 may cause interferences each other. The macro cell A 520 collects the information about the UEs 542, 544, 552, and 554, and sends the RRHs 540 and 550 the information or command for scheduling such that the RRHs 540 and 550 perform CoMP CS. For CoMP CS, the cell edge UE 544 of the RRH A_1 540 and the inner UE 552 of the RRH A_2 550 may be allocated the same time-frequency resource (first resource). In this case, the two UEs 544 and 552 are paired. Likewise, the inner UE 542 of the RRH A_1 540 and the cell edge UE 554 of the RRH A_2 550 may be allocated the same time-frequency resource (second resource) for CoMP CS. In this case, the two UEs 542 and 554 are paired with each other. The first and second resources are different resources. The macro cell A 520 is capable of controlling resource allocation in the course of minimizing interference between paired UEs. As described above with reference to FIG. 5A, the CoMP station's control may be reflected.

In the case of applying exemplary embodiments of the present invention to the CoMP scenarios 3 and 4, the IoT to the cell edge UE can be reduced within the RRH (sub-cell) so as to extend the uplink coverage. Furthermore, the inter-RRH (sub-cell) UE pairing-based CoMP CS is capable of improving the network efficiency and uplink capacity.

Figure 6A:
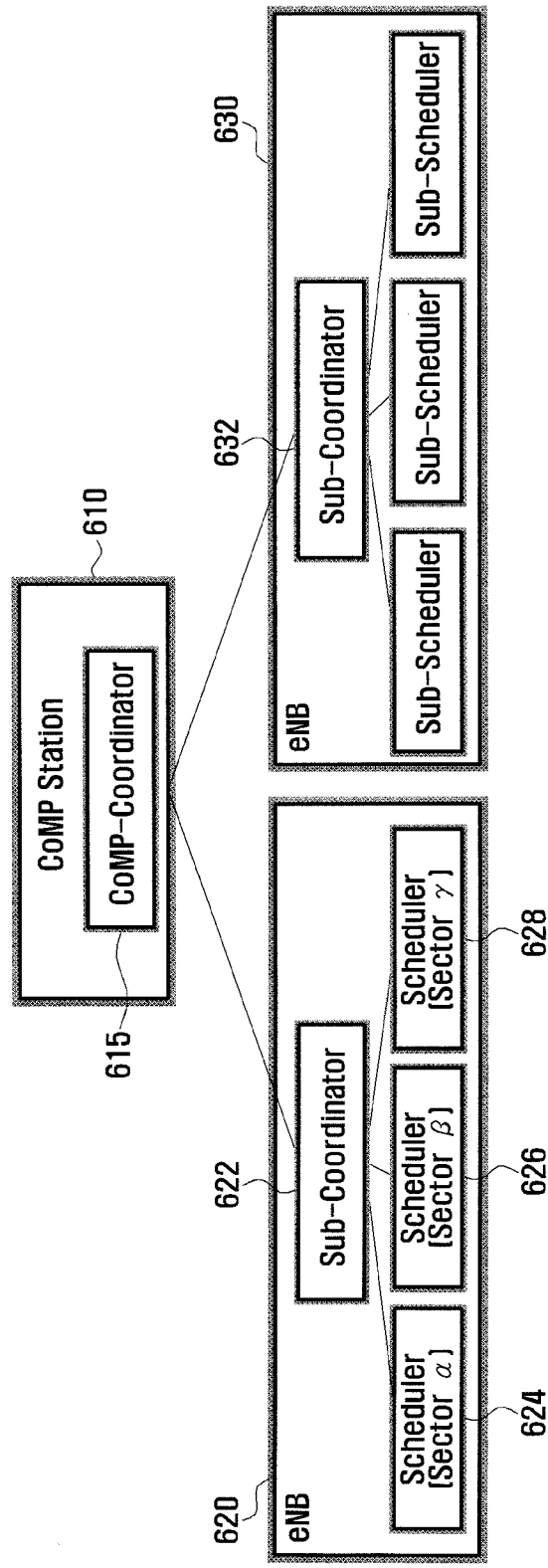
FIG. 6A is a diagram illustrating a hierarchical structure of a Co-located Antenna Systems (CAS) mode coordinator and scheduler according to an exemplary embodiment of the present invention.

FIG. 6A is a diagram illustrating a hierarchical structure of a Co-located Antenna Systems (CAS) mode coordinator and scheduler according to an exemplary embodiment of the present invention. The scenarios 1 and 2 of FIG. 1 take the CAS.

Referring to FIG. 6A, the CoMP station 610 includes a CoMP coordinator 615. The eNBs 620 and 630 include sub-coordinator 622 and 632, respectively. The CoMP coordinator 615 manages and controls the sub-coordinators. The sub-coordinator 622 manages and controls the schedulers 624, 626, and 628 of the eNB 620.

The sub-coordinator 622 performs scheduling on the macro cells 624, 626, and 628 corresponding to sector α, β, and γ dependent on the eNB 620. In the network architecture, the sub-coordinator 622 establishes a master-slave relationship with the CoMP coordinator 615. The sub-coordinator 622 is the slave and the CoMP coordinator 615 is the master. The CoMP coordinator 615 and the sub-coordinator 622 share information. The CoMP coordinator 615 is capable of controlling the sub-coordinator 622 or providing the sub-coordinator 622 of the information for use in inter-cell coordinated scheduling. The schedulers 624, 626, and 628 perform scheduling (resource allocation) using the control channel information for communication with the eNB 620 and the pilot information. The schedulers 624, 626, and 628 are capable of inter-cell coordinated scheduling restricted to the case from the sub-coordinator 622 to the eNB 620. For example, the schedulers 624, 626, and 628 are capable of uplink coordinated scheduling in consideration of the cell edge UEs located at the sector boundary areas. The scheduler of each sector is capable of receiving the coordinated scheduling information of other eNB 630 from the CoMP coordinator 615 to perform the coordinated scheduling with the cells of other eNB 630.

Figure 6B:
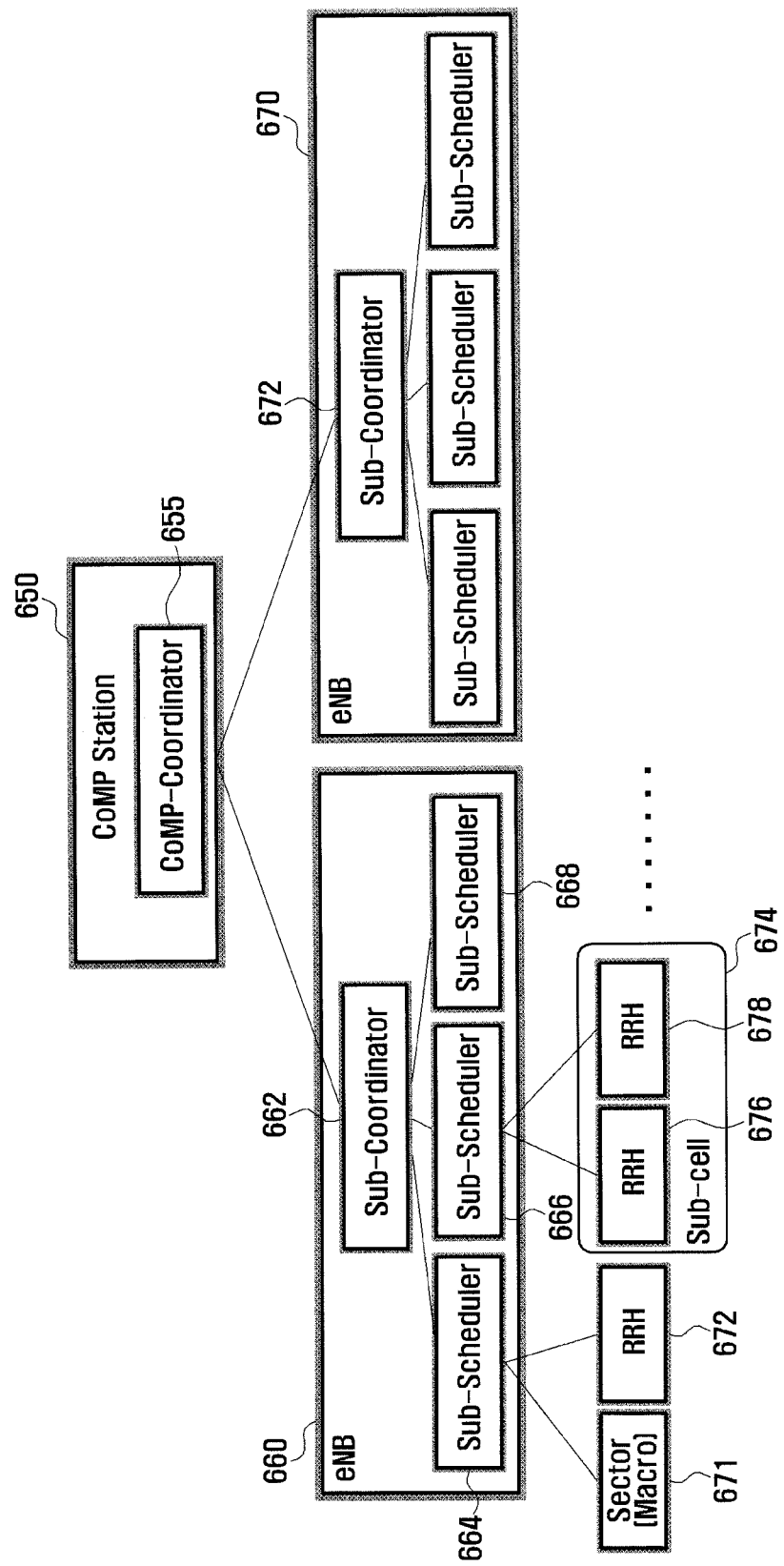
FIG. 6B is a diagram illustrating a hierarchical structure of a Distributed Antenna System mode coordinator and scheduler according to an exemplary embodiment of the present invention.

FIG. 6B is a diagram illustrating a hierarchical structure of a Distributed Antenna System (DAS) mode coordinator and scheduler according to an exemplary embodiment of the present invention.

The CoMP station 650 includes a CoMP coordinator 655. The eNBs 660 and 670 include sub-coordinators 662 and 672, respectively. The CoMP coordinator 655 manages and controls the sub-coordinator 662 and 672. The sub-coordinator 662 manages and controls the sub-schedulers 664, 666, and 668 of the eNB 620. The sub-scheduler 666 receives the channel information (including at least one of CQI, PMI, RI, and SRS) fed back from the UEs communicating in the cell coverage of the sub-cell 674 to determine the control information (resource allocation information of PDCCH/PUCCH). According to the DAS-based CoMP scenario 4 170, the sub-cell 674 is composed of plural RRHs 676 and 678 or an RRH 672 and macro sector 671. The sub-coordinator 662 is capable of inter-cell coordinated scheduling of the sub-cells dependent on the local eNB 660.

On the network architecture, the sub-coordinator 622 and the CoMP coordinator 655 establish the master-slave relationship. The sub-coordinator 662 corresponds to the slave. The CoMP coordinator 655 corresponds to the master. If the sub-coordinator 622 performs inter-RRH coordinated scheduling locally within the range of the eNB 660, the CoMP coordinator 655 identifies all of the inter-sub-cell coordinated scheduling information retained in the plural sub-coordinators 622 and 672 and determines the macro cell-RRH coordinated scheduling information.

The sub-schedulers 664, 666, and 668 depended on the sub-coordinator 622 are capable of scheduling (resource allocation) using the control channel information for communication with the eNB 660 and the pilot information. The schedulers 664, 666, and 668 are capable of performing inter-cell coordinated scheduling restricted within the range of the eNB 660 according to the information received from the sub-coordinator 662. For example, the uplink coordinated scheduling can be performed in consideration of the cell edge UEs located at inter-sector boundary region. The scheduler of each sector receives coordinated scheduling information on the other eNB 670 from the CoMP coordinator 655 to perform coordinated scheduling with the cells belonging to other eNB 670.

Figure 7:
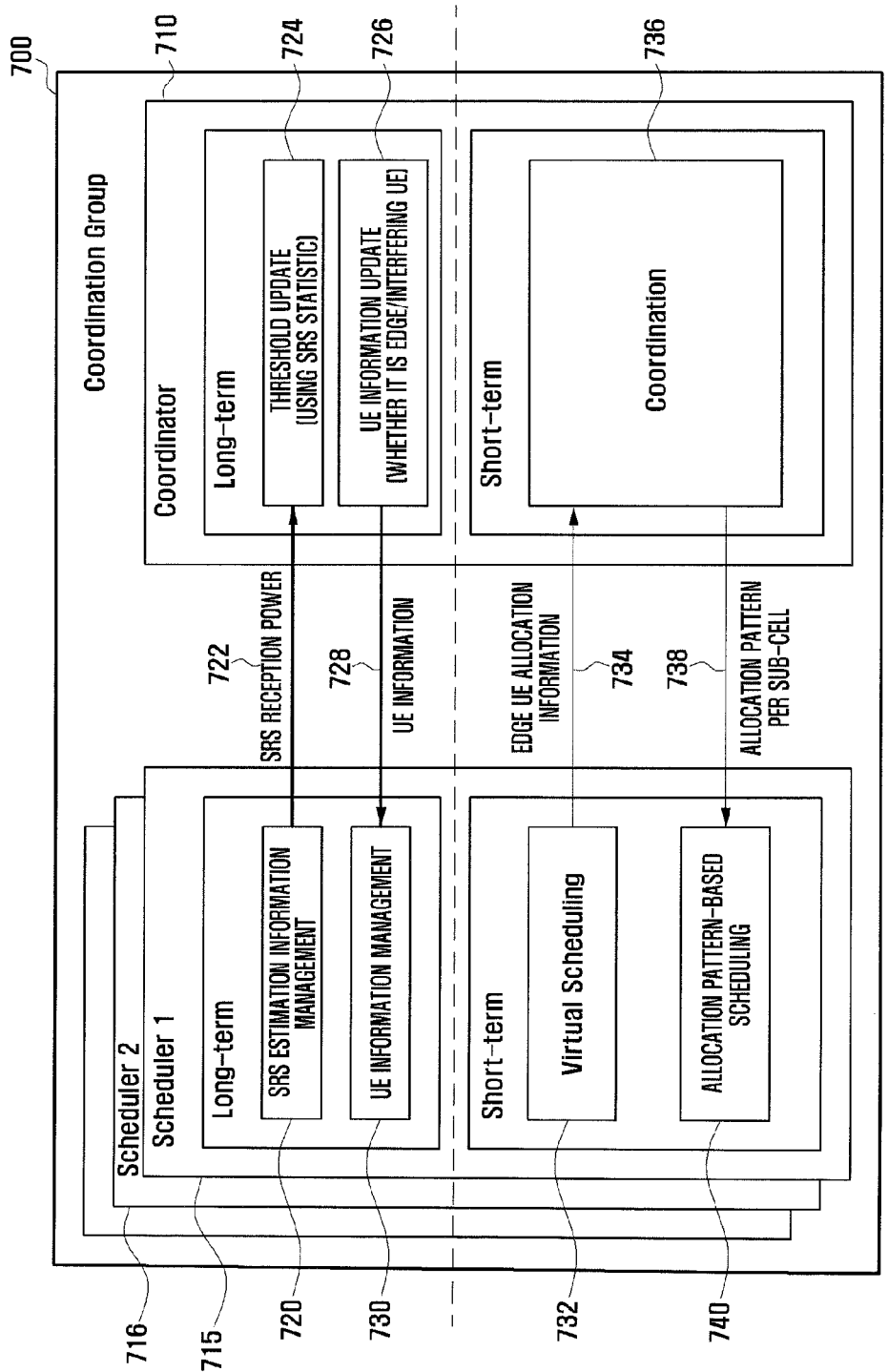
FIG. 7 is a diagram illustrating scheduler-coordinator interoperation according to a first exemplary embodiment of the present invention.

FIG. 7 is a diagram illustrating scheduler-coordinator interoperation according to a first exemplary embodiment of the present invention.

Referring to FIG. 7, the coordination group 700 includes a coordinator 710 and plural schedulers 715 and 716. The relationship between the coordinator 710 and the schedulers 715 and 716 corresponds to the relationship between the sub-coordinator 622 and the schedulers 624, 626, and 628 in FIG. 6A. Likewise, the relationship between the coordinator 710 and the schedulers 715 and 716 corresponds to the relationship between the sub-coordinator 622 and the sub-schedulers 664, 666, and 668.

Steps 720 to 730 are performed in a long-term duration as compared to steps 732 to 740. The schedulers 715 and 716 belonging to the coordination group 700 collect the SRS reception power information of the UEs within the corresponding cell at step 720. The schedulers 715 and 716 send the collected SRS reception power information to the coordinator 710 at step 722. The coordinator 710 updates the threshold value for sorting the UEs based on the SRS reception power information of each UE at step 724. The threshold value calculation method is described below with reference to FIGS. 12A and 12B.

The coordinator 710 sorts the UEs into cell edge terminals and non-cell edge terminals and generates the information on the interference amount from each UE to respective cells at step 726. The coordinator 710 sorts the UEs into the cell edge UEs and non-cell edge UEs based on the SRS reception power information. The coordinator 710 also generates the information on the interference size of each UE which influences the other cells in the coordination group 700. The UE distinction information (whether it is cell edge UE) may be generated as follows based on the SRS reception power information:

cell edge UE: SRS reception power>cell edge UE threshold value;

non-cell edge UE: SRS reception power<=cell edge UE threshold value.

The SRS reception power is the reception power of SRS received at the serving cell of each UE (SRS transmitted by each UE). The cell edge UE threshold value can be configured at step 724. According to an exemplary embodiment of the present invention, the threshold value configuration process of step 724 may be omitted, and a predetermined threshold value may be used.

The coordinator 710 also generates the flag information indicating the interference size which each UE which provokes to the respective cells based on the collected per-cell SRS reception power information as follows:

interference: SRS reception power (i,j)>interference threshold value;

non-interference: SRS reception power (i,j)<=interference threshold value.

where SRS reception power (i,j) denotes the reception power of $i^{th}$ UE at the $j^{th}$ cell. The interference threshold value can be configured at step 724. The interference threshold value can be equal to or different from the threshold value of the cell edge UE. According to an exemplary embodiment of the present invention, the threshold value configuration process of step 724 may be omitted, and a predetermined threshold value may be used.

According to another exemplary embodiment of the present invention, the coordinator 710 is capable of sorting the UEs into cell edge UEs and non-cell edge UEs based on the estimated per-UE Signal to Interference plus Noise Ratio (SINR) information. The UE distinction information (whether it is cell edge UE) can be generated through the following procedure based on the SRS reception power information. The estimated SINR information can be calculated using Noise and Interference (NI) value estimated from the reception power of SRS received by the serving cell of each UE (SRS transmitted by each UE) and Interference over Thermal noise (IoT) of each cell:

Cell edge UE: SINR estimation value>cell edge SINR threshold value;

Non-cell edge UE: SINR estimation value<=cell edge SINR threshold value.

The coordinator 710 also generates the flag information indicating the interference size which each UE provokes to the respective cells based on the estimated SINR information of the respective cells as follows:

interference: estimated SINR value (i,j)>SINR interference threshold value;

non-interference: estimated SINR value (i,j)<=SINR interference threshold value.

where the estimated SINR value (i,j) is the $i^{th}$ UE's estimated SINR value received at the $j^{th}$ cell. The estimated SINR information can be calculated using Noise and Interference (NI) value estimated from the reception power of SRS received by the serving cell of each UE (SRS transmitted by each UE) and Interference over Thermal noise (IoT) of each cell. The interference threshold value can be equal to or different from the threshold value of the cell edge UE. According to an exemplary embodiment of the present invention, the threshold value configuration process of step 724 may be omitted, and a predetermined threshold value may be used.

Figure 8:
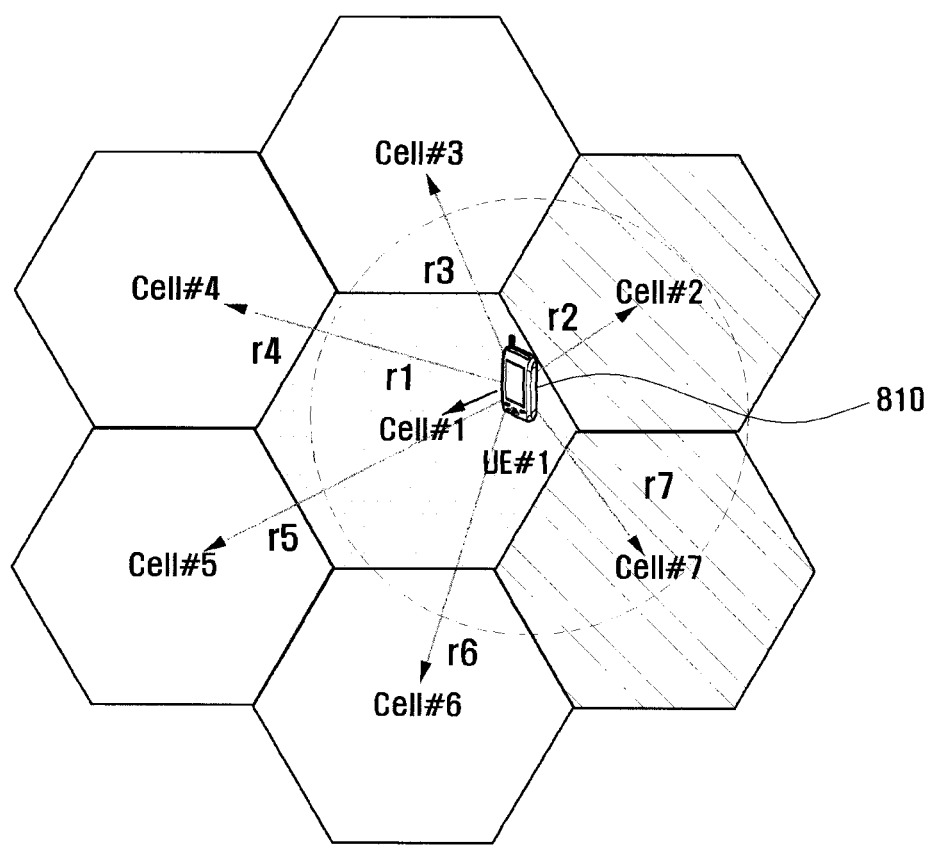
FIG. 8 is a diagram illustrating a principle of mitigating interference caused by a User Equipment (UE) to neighbor cells according to an exemplary embodiment of the present invention.

FIG. 8 is a diagram illustrating a principle of mitigating interference caused by a UE to neighbor cells according to an exemplary embodiment of the present invention.

Referring to FIG. 8, the serving cell of the first UE 810 is the first cell r1. If the first UE 810 shows the SRS reception power higher than interference threshold value for the seventh cell (r7) and the second cell (r2), the coordinator 710 determines that the seventh cell (r7) and the second cell (r2) are interference cells for the first UE 810. If the first UE 810 shows the SRS reception power equal to or less than the interference threshold value to the third to sixth cells (r3 to r6), the coordinator 710 determines that the third to sixth cells (r2 to r6) as non-interference cells for the first UE 810.

Table 1 shows the interference information flags for the first UE 810.

TABLE 1

| | Cell | | | | | | |
|---|---|---|---|---|---|---|---|
| | First cell | Second cell | Third cell | Fourth cell | Fifth cell | Sixth cell | Seventh cell |
| Flag | Serving | Interference | Non-interference | Non-interference | Non-interference | Non-interference | interference |

Referring back to FIG. 7, the coordinator 710 sends the schedulers 715 and 716 the UE distinction information and interference size information at step 728. The schedulers 715 and 716 store the UE distinction information and interference size information at step 730 and use the information through steps 732 to 740. According to an exemplary embodiment of the present invention, only one of the UE distinction information and the interference size information can be transferred/used.

Steps 732 to 740 are performed in a short term duration as compared to steps 720 to 730. The schedulers 715 and 716 perform virtual scheduling for the cell based on the received UE distinction information and interference size information, and generate the cell edge UE allocation ratio information as a cell edge UE's scheduling ratio at step 732. The schedulers 715 and 716 calculate the scheduling matric of each UE and determine the ratio of the cell edge UEs to the selected UE in an order of scheduling metric. The cell edge UE determination is performed based on the information received at step 728. The number of selected UEs can be adjusted according to a predetermined parameter. The cell edge UE ratio can be managed by each cell through Infinite Impulse Response (IIR) filtering.

The schedulers 715 and 716 send the cell edge UE allocation ratio information to the coordinator 710 at step 734. The coordinator 710 generates per-cell edge UE resource allocation pattern based on the cell edge UE allocation ratio information at step 736. The coordinator 710 calculates the number of cell edge regions necessary per cell, i.e., a number of bands to be allocated to a cell edge UE N2 using equation (1):

$$N2 = \text{ceil}((\text{number of bands capable of being allocated}) \times (\text{cell edge UE allocation ratio}))$$ Equation (1)

Figure 9:
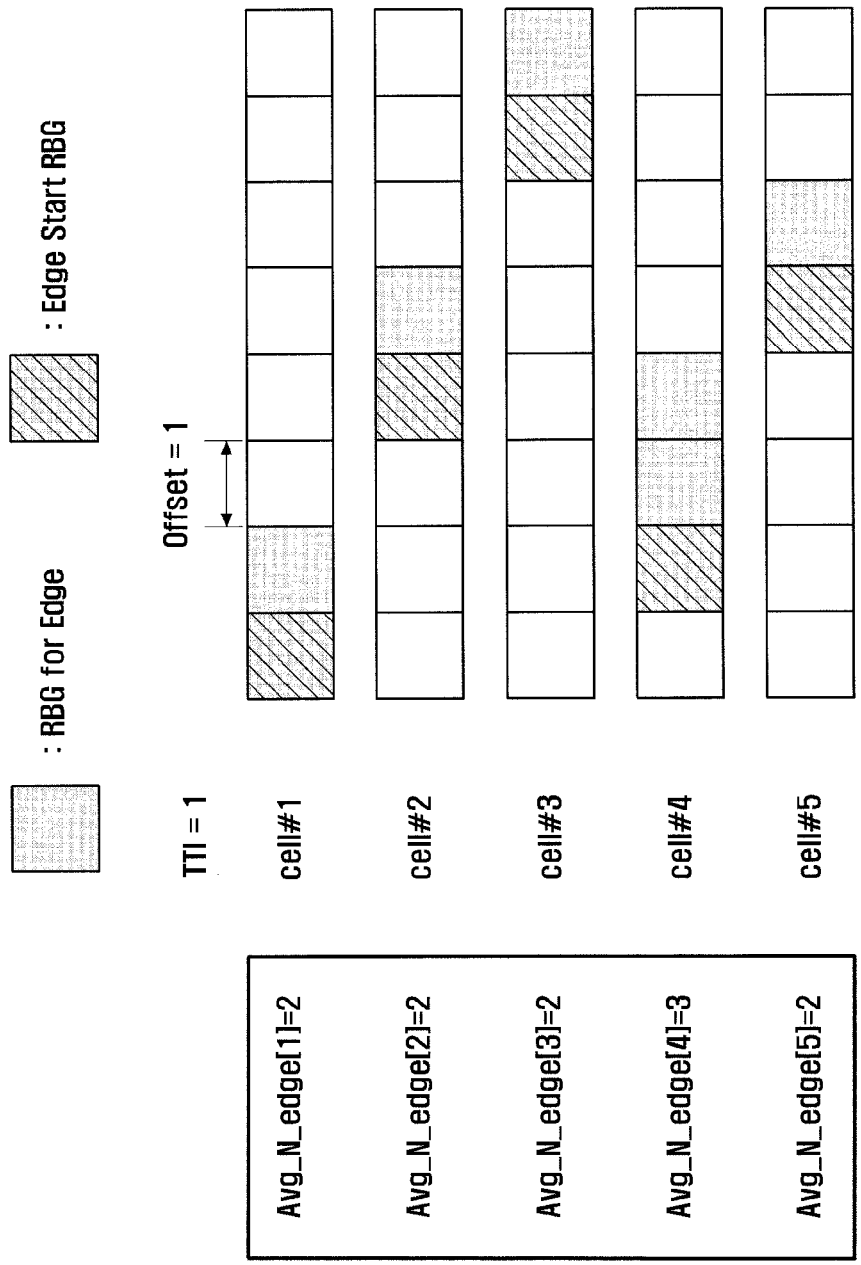
FIG. 9 is a diagram illustrating an exemplary cell edge UE resource allocation pattern for use in a method according to an exemplary embodiment of the present invention.

FIG. 9 is a diagram illustrating an exemplary cell edge UE resource allocation pattern for use in a method according to an exemplary embodiment of the present invention.

Referring to FIG. 9, based on the calculated number of bands, the coordinator 710 configures cell edge area of each cell and notifies the corresponding cell of this. For example, the coordinator 710 is capable of transferring initial Resource Block Group (RBG) index and offset parameter to the respective scheduler 715 and 716.

Referring back to FIG. 7, the coordinator 710 sends the schedulers 715 and 716 the respective cell edge UE resource allocation patterns at step 738. The schedulers 715 and 716 perform scheduling based on the received cell edge UE resource application patterns at step 740. Each scheduler determines, based on the received cell edge UE resource allocation pattern information, whether another cell using the same band is configured with a cell edge area. If a certain area is configured as a cell edge area, the UE which is registered having interfering relationship with the corresponding cell is not allocated the corresponding band or restricted to reduce transmission power on the corresponding band.

Figure 10:
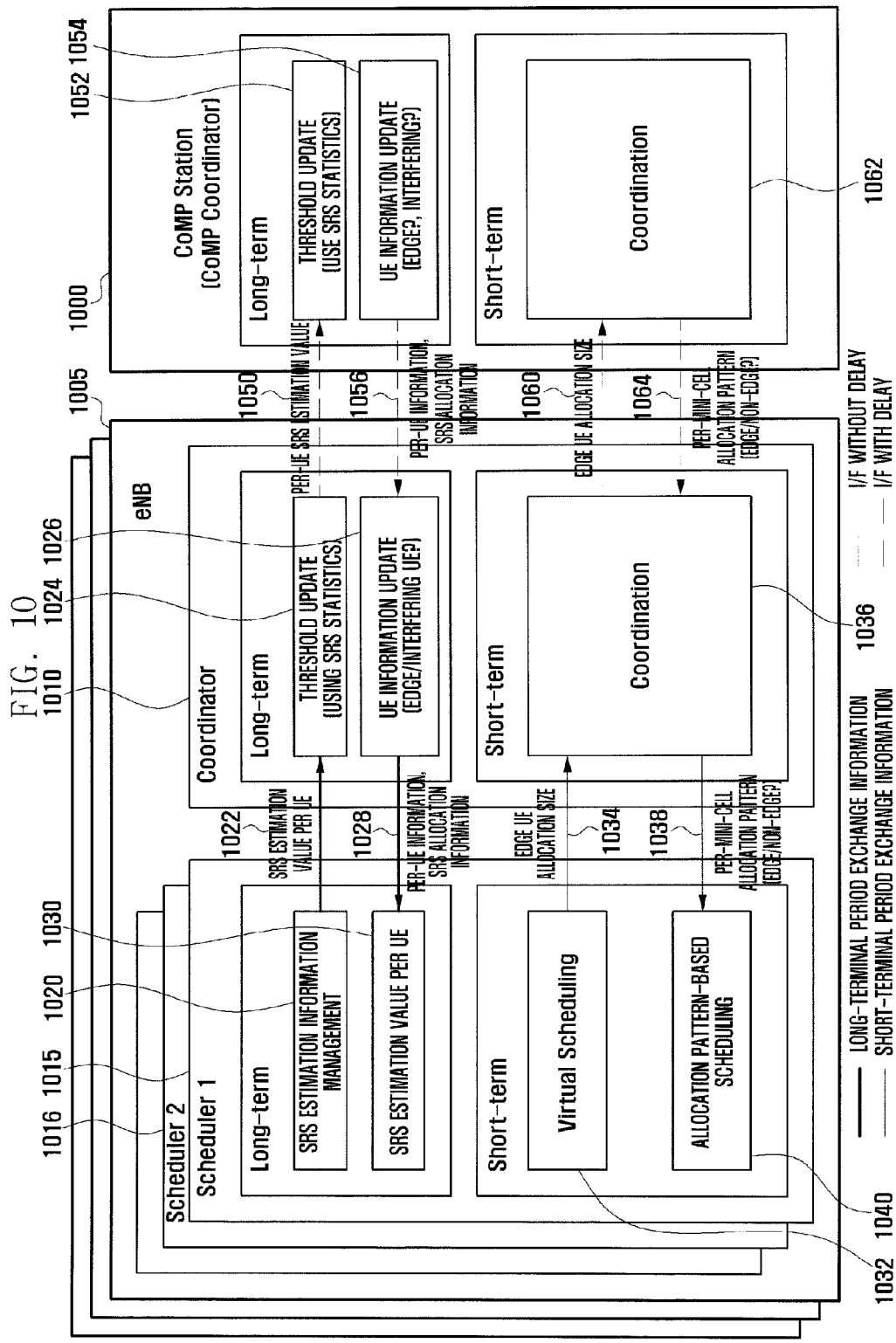
FIG. 10 is a diagram illustrating scheduler-coordinator-CoMP coordinator interoperation according to a second exemplary embodiment of the present invention.

FIG. 10 is a diagram illustrating scheduler-coordinator-CoMP coordinator interoperation according to a second exemplary embodiment of the present invention.

Referring to FIG. 10, the coordinator 1010 and schedulers 1015 and 1016 of the eNB 1005 exchange SRS reception power information like the coordinator 710 and the schedulers 715 and 715 of FIG. 7. According to the second exemplary embodiment, however, the coordinator 1010 transfers the information collected from the schedulers to the CoMP coordinator 1000 such that the CoMP coordinator 1000 controls scheduling the cell edge UEs located at inter-eNB boundary region based on the information.

With the exception of the steps described below, steps 1020, 1022, 1024, 1026, 1028, 1030, 1032, 1040, 1034, 1036, 1038, and 1040 are identical with steps 720, 722, 724, 726, 728, 730, 732, 740, 734, 736, 738, and 740 of FIG. 7. Accordingly, detailed descriptions on the same steps are omitted herein.

The communication between the coordinator 101 and the CoMP coordinator may be delayed for a predetermined duration.

Steps 1050 to 1056 are performed in a long term duration as compared to steps 1060 to 1064. The coordinator 1010 transfers the received SRS reception power information to the CoMP coordinator 1000 at step 1050. The CoMP coordinator calculates the threshold value at step 1052 as at steps 724 and 726 of FIG. 7 and generates information on whether the UE is a cell edge UE (UE distinction information), a neighbor sub-cell list of the sub-cells, and the information on the SRS reception power which each sub-cell has received from the neighbor cells (neighbor cell SRS reception power information) based on the threshold value at step 1054. The CoMP coordinator 1000 sends to the coordinator 1010 the UE distinction information and neighbor cell the reception power information at step 1056. The CoMP coordinator 1000 also may send the coordinator 1010 the threshold value generated at step 1052. The coordinator 1010 may send the scheduler 1030 the UE distinction information and neighbor cell SRS reception power information. The coordinator 1010 also may update the retained threshold value based on the UE distinction information, threshold value information, and neighbor cell SRS reception power information to determine whether the UE is a cell edge UE. The threshold value information may include the threshold value for checking the inter-cell edge UE and the threshold value for determining the inter-coordinator cell edge UE that are different from each other. The information on whether the UE is a cell edge UE may be sent back to the schedule scheduler 1015 and 1016.

Steps 1060 to 1064 may be performed in a short term duration as compared to steps 1050 to 1056. The coordinator 1010 sends the CoMP coordinator 1000 the cell edge UE allocation ratio information collected from the schedulers 1015 and 1016 at step 1060. The CoMP coordinator 1000 generates the cell edge UE resource allocation pattern of each eNB 1005 based on the received cell edge UE allocation ratio information at step 1062. The CoMP coordinator 1000 sends the coordinator 1010 the generated cell edge UE allocation pattern at step 1064. The coordinator 1010 sends the schedulers 1015 and 1016 the received cell edge resource allocation pattern information such that the schedulers 1015 and 1016 perform scheduling by referencing the cell edge resource allocation pattern information as described above with reference to FIG. 7.

Figure 11B:
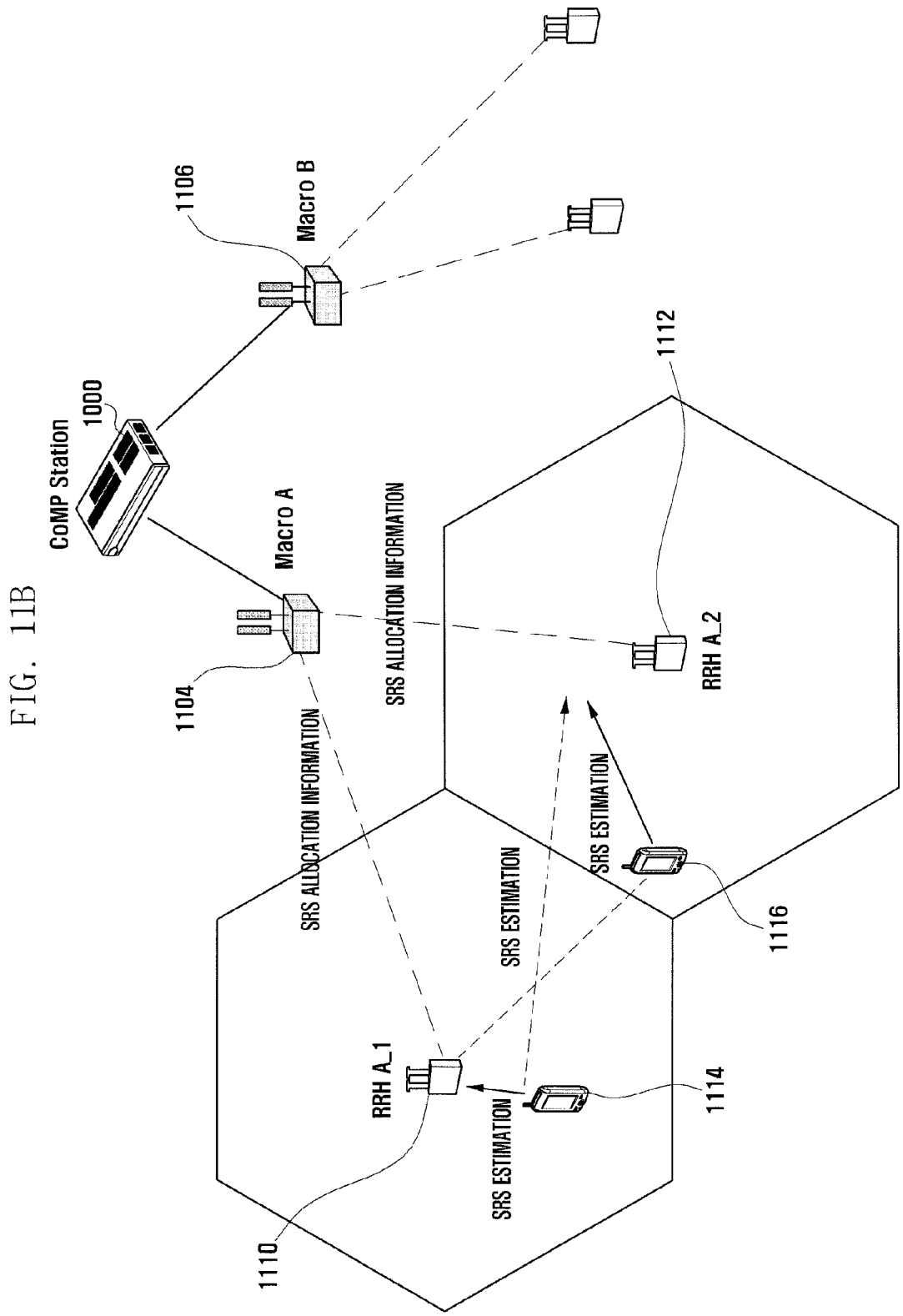

FIGS. 11A and 11B are diagrams illustrating SRS reception power information transmission procedures of a coordinated communication method according to an exemplary embodiment of the present invention.

Referring to FIG. 11A, the macro eNBs 1104 and 1106 measure the SRS reception powers from the UEs 1102 and send the measurement results to the CoMP station (CoMP coordinator) 1000.

Referring to FIG. 11B, the RRHs 1110 and 1112 measure the SRS reception power from the UEs 1114 and 1116 and send the measurement result to the macro eNB 1104. The SRS reception power information may be sent back to the CoMP station (CoMP coordinator) 1000.

The procedures of FIGS. 11A and 11B can be applied to the CoMP scenarios 110, 130, 150, and 170 illustrated in FIG. 1.

Figure 12A:
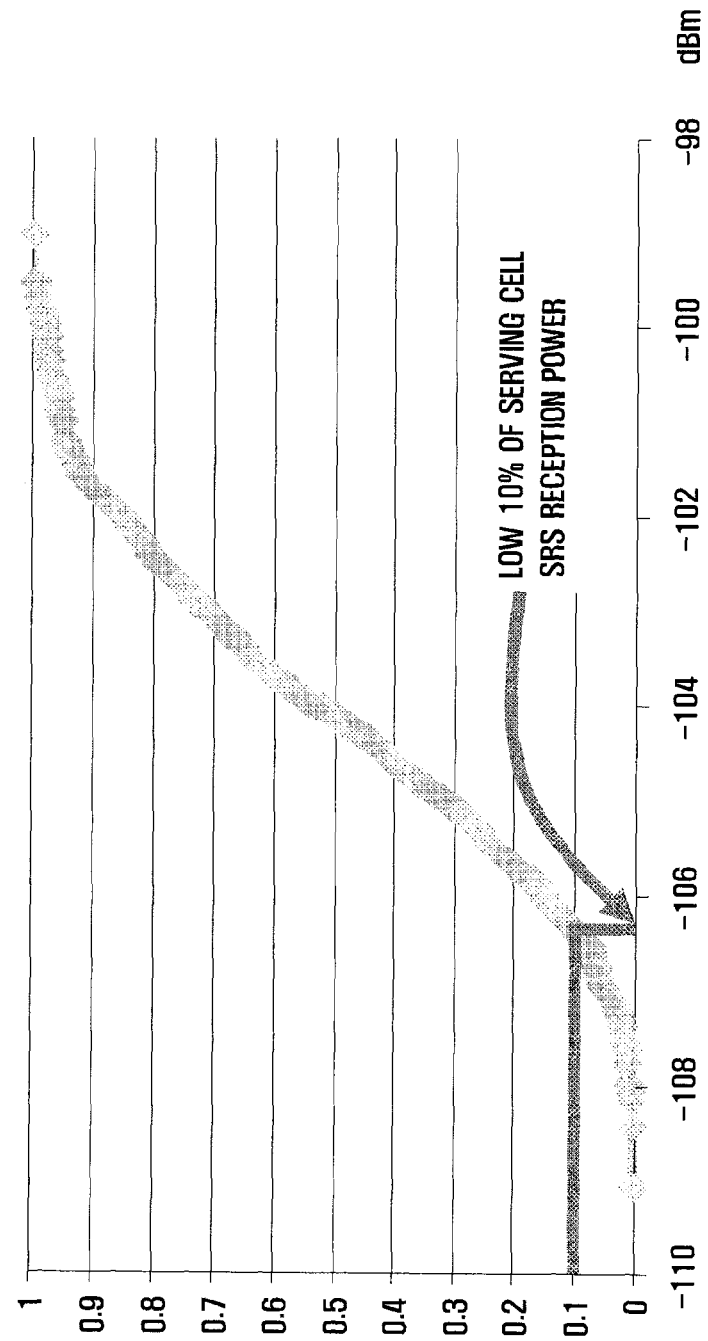
FIG. 12A is a graph illustrating a principle of configuring a threshold value for determining inter-cell edge UE in a coordinated communication method according to an exemplary embodiment of the present invention.

FIG. 12A is a graph illustrating a principle of configuring a threshold value for determining inter-cell edge UE in a coordinated communication method according to an exemplary embodiment of the present invention. For example, the coordinator 1010 is capable of determining the UEs of low 10% of SRS reception power distribution of the serving cell belonging to the coordinator as cell edge UEs. For example, the serving cell SRS reception power of the UE having low 10% of SRS reception power distribution is determined as the cell edge UE threshold value.

FIG. 12B is a graph illustrating a principle of configuring a threshold value for determining inter-coordinator cell edge UE in a coordinated communication method according to an exemplary embodiment of the present invention. For example, the CoMP coordinator 1000 determines the UE corresponding to low 10% of the SRS reception power distribution of the serving cell belong into to the CoMP coordinator. For example, the serving cell SRS reception power of the UE having low 10% of SRS reception power distribution is determined as the inter-coordinator cell edge threshold value.

Referring to FIGS. 12A and 12B, according the cell edge UE threshold value for determining the inter-cell edge UE and the cell edge UE threshold value for determining the inter-coordinator cell edge UE may differ from each other. However, the two values may be maintained as the same value according to an exemplary embodiment of the present invention.

The interference relationship described with reference to table 1 can be applied to the inter-coordinator interference relationship.

Table 2 shows an interference information flag for a specific UE.

TABLE 2

| | Coordinator | | | | | | |
| --- | --- | --- | --- | --- | --- | --- | --- |
| | First coordinator | Second coordinator | Third coordinator | Fourth coordinator | Fifth coordinator | Sixth coordinator | Seventh coordinator |
| Flag | Edge | Interference | Non-interference | Non-interference | Non-interference | Non-interference | interference |

The corresponding UE is a cell edge UE belonging to the first coordinator and causing interference to the second and seventh coordinators. The corresponding UE does cause interference to the third to sixth coordinators. Accordingly, in the case of the cell edge UE of the coordinators having interference relationship in inter-coordinator coordinated scheduling (first and seventh coordinators), the corresponding UE is not scheduled or the transmit power of the corresponding UE is restricted to improve the communication quality of the cell edge UE.

Figure 13:
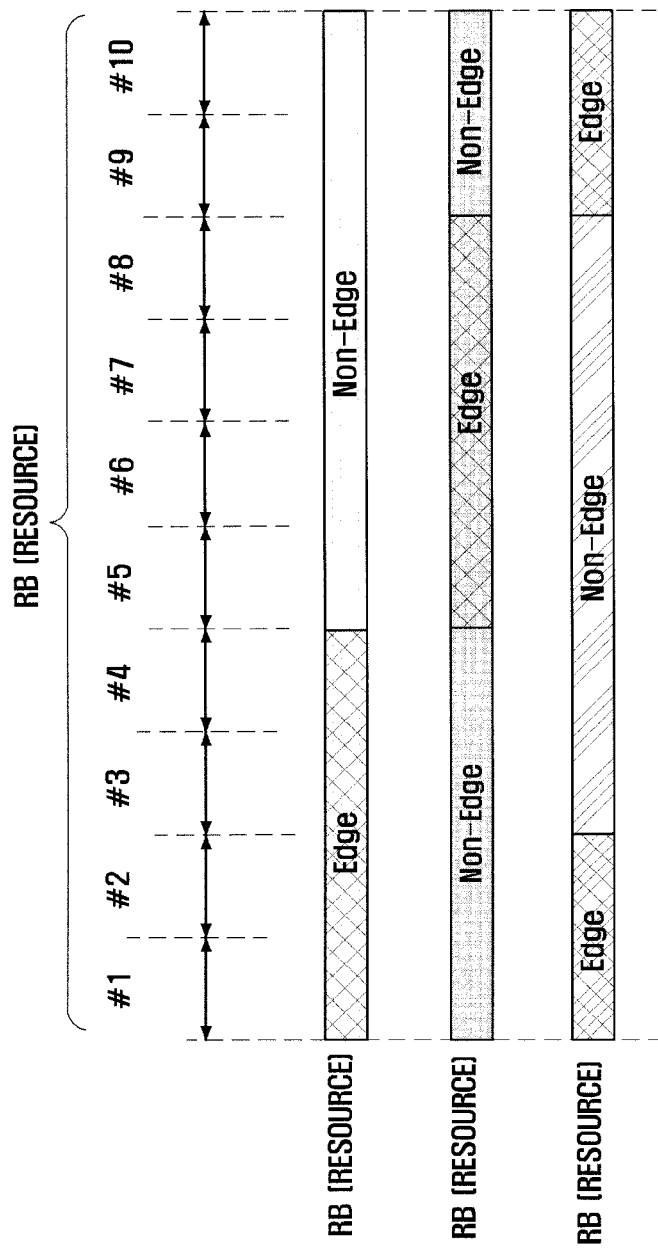
FIG. 13 is a diagram illustrating a cell edge UE scheduling mechanism for inter-coordinator/inter-cell coordinated scheduling in a coordinated communication method according to an exemplary embodiment of the present invention.

FIG. 13 is a diagram illustrating a cell edge UE scheduling mechanism for inter-coordinator/inter-cell coordinated scheduling in a coordinated communication method according to an exemplary embodiment of the present invention.

Referring to FIG. 13, the coordinator 1010 is capable of adjusting the cell edge UE resource allocation pattern in the course of minimizing collision of resource bands of the cell edge UEs of the cells based on the number of cell edge UE resources (resources allocated to the cell edge UEs) from the schedulers 1015 and 1016 at every Transmission Time Interval (TTI).

In FIG. 13, resources 1 to 4 are designated for the cell edge UEs in cell 1, resources 5 to 8 are designated for cell edge UEs in cell 2, and resources 9, 10, 1, and 2 are designated for cell edge UEs in cell 3.

Likewise, the CoMP coordinator 1000 is capable of adjusting the cell edge resource allocation pattern in the course of minimizing overlap of the cell edge resource bands of the coordinators 1010 based on the numbers of cell edge UE resources (resources allocated to the cell edge UEs) that are transmitted by the scheduler 1015 and 1016 at every Transmission Time Interval (TTI).

Figure 14:
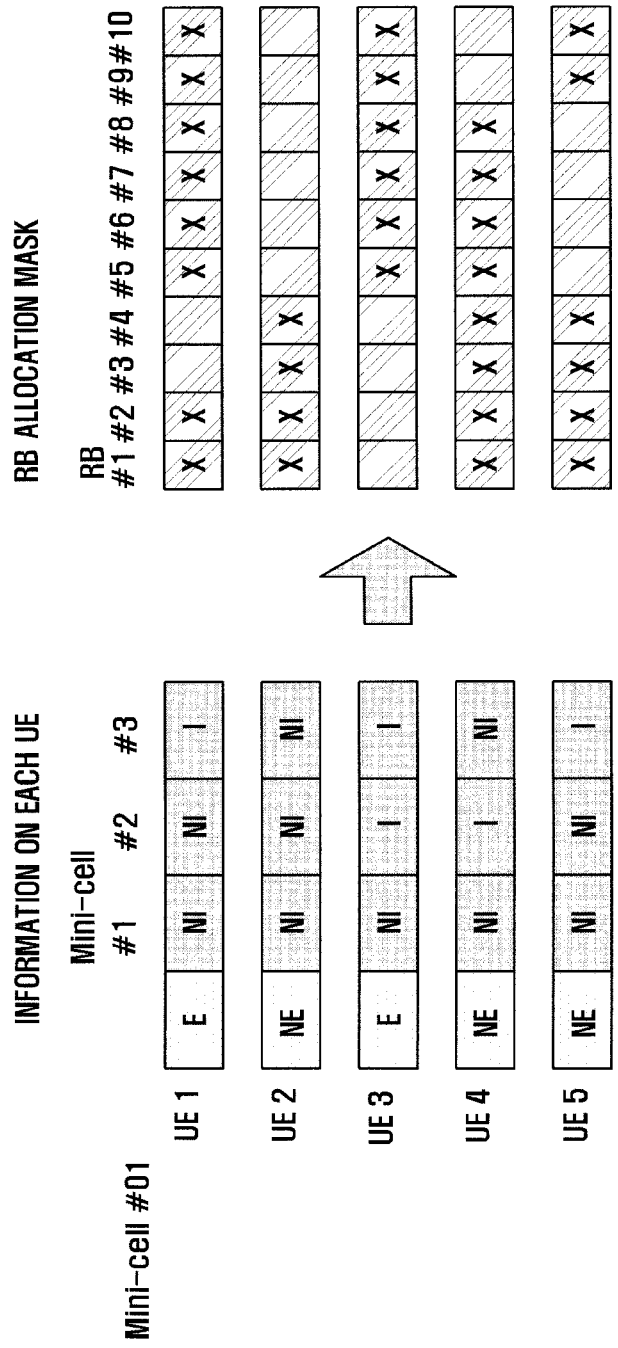
FIG. 14 is a diagram illustrating the principle of masking terminals in a coordinated communication method according to an exemplary embodiment of the present invention.

FIG. 14 is a diagram illustrating the principle of masking terminals in coordinated communication method according to an exemplary embodiment of the present invention.

Referring to FIG. 14, the UEs are served by cell 1. The UEs 1 and 3 are cell edge UEs, and the UEs 4 and 5 are non-cell edge UEs. The UE 1 has the Interference relationship (I) with the cell 3 and Non-Interference (NI) relationship with the cells 1 and 2. The interference and non-interference relationships of the other UEs are also presented in FIG. 14. The mark x at the left part showing the RB allocation masks denotes the RB not allocated. In this case, it is shown that the cell edge UEs (UEs 1 and 3) are allocated resources at RBs 1 to 4.

Figure 15:
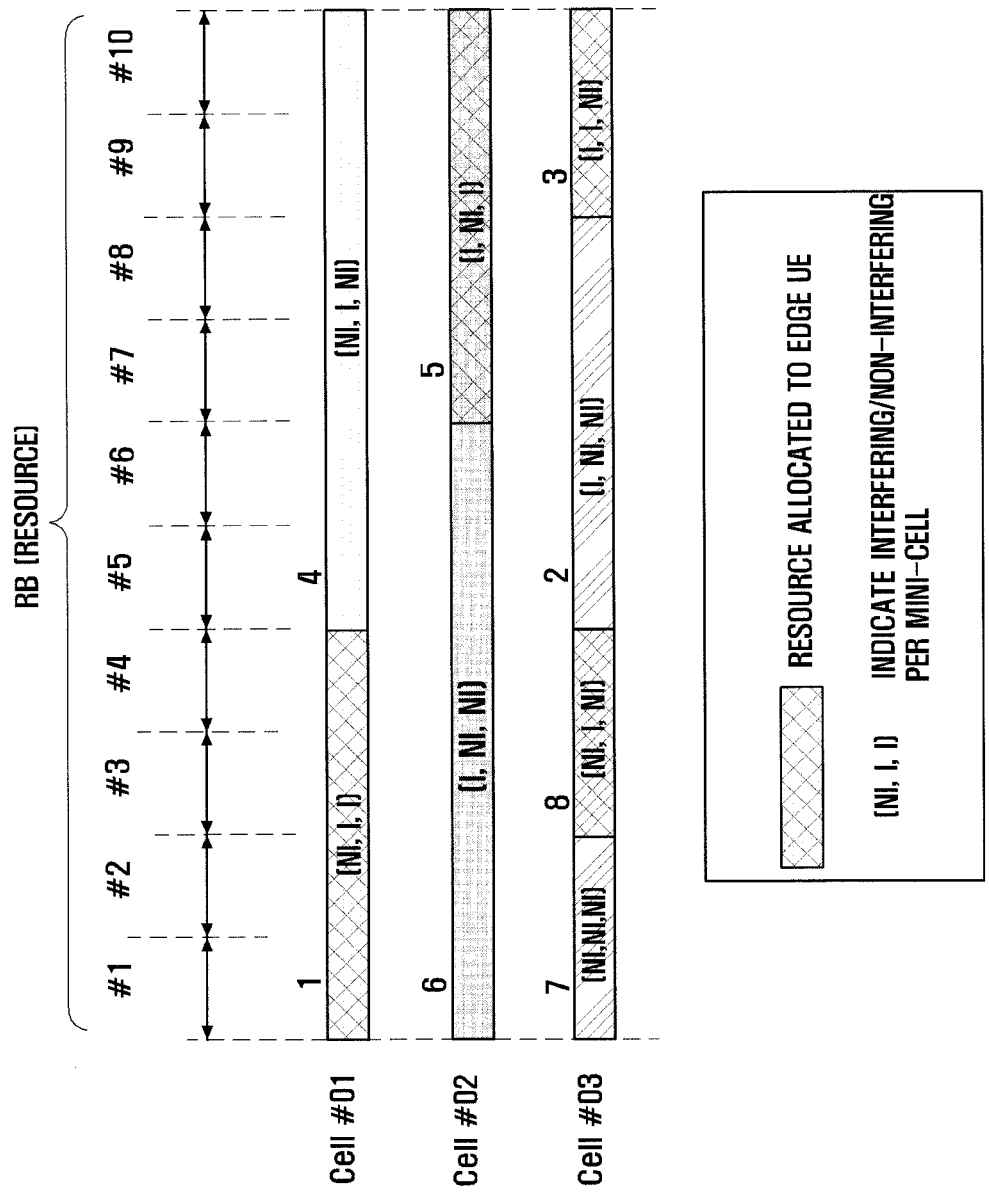
FIG. 15 is a diagram illustrating resource allocation according to a cell edge resource allocation pattern in a coordinated communication method according to an exemplary embodiment of the present invention.

FIG. 15 is a diagram illustrating resource allocation according to a cell edge resource allocation pattern in the coordinated communication method according to an exemplary embodiment of the present invention.

Referring to FIG. 15, the marking such as (NI, I, I) indicates the interference (non-interference) relationships of the UE allocated the corresponding resource with the cells 1, 2, and 3. (NI, I, I) denotes that the UE causes interference to the cells 2 and 3 but not cell 1.

For example, the scheduling is performed in the course of allocating the cell edge UE allocation resource of cell 1 to the UE having a high urgency and the cell edge UE allocation resource of the cell (cell 2) having non-interference relationship with the cell 1 to other cell edge UEs.

The interference threshold value update procedure as at step 724 of FIG. 7 is performed as follows. The interference threshold value can be updated periodically. The interference threshold value can be adjusted in the course of maximizing the radio resource capacity while maintaining the cell edge UE's performance above a predetermined level. The radio resource use amount can be indicated by defining resource usage amount:

Average resource usage=sum(resource usage amount)/(number of cells)

if (average resource usage>=RU_th)
   Delta_Interfering=Delta_Interfering+0.5
Else
   Delta_Interfering=Delta_Interfering−0.5

Here, Ru_th denotes a target value of radio resource usage and has the initial value of 0.98.

According to an exemplary embodiment of the present invention, the interface between the CoMP station (higher layer entity) and each cell's scheduler (lower layer entity) are connected through a fiber optic. In this case, there is little backhaul delay so as to exchange the coordination information in real time.

According to another exemplary embodiment of the present invention, the CoMP station (higher layer entity) and each cell's scheduler (lower layer entity) can be connected through Ethernet. In this case, a few milliseconds of backhaul delay occurs so as to cause bidirectional delay of coordination information. However, the Ethernet is cost effective as compared to the fiber optic and facilitates forming a cell cluster.

The information on the sub-scheduler of each RRH can be transmitted as well as the information on each cell's scheduler (lower layer entity).

According to another exemplary embodiment of the present invention, the CoMP station (higher layer entity) and each cell's scheduler (lower layer entity) can be connected through Ethernet. In this case, it is possible to restrict the cooperation information amount to minimize the backhaul delay for inter-cell cooperation. The information on the sub-scheduler of each RRH can be transmitted as well as the information on each cell's scheduler (lower layer entity).

According to another exemplary embodiment of the present invention, when the interface between the CoMP station (higher layer entity) and each cell's scheduler (lower layer entity) operates abnormally, it is possible to perform the restricted inter-cell coordinated scheduling based on the cooperation information among the schedulers (low layer entities) of the cells of the eNB. The information on the sub-scheduler of each RRH can be transmitted as well as the information on each cell's scheduler (lower layer entity).

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the exemplary embodiments of the invention, may be, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the invention and is not intended to be limiting. Since modifications of the disclosed exemplary embodiments incorporating the spirit and substance of the invention may occur to persons skilled in the art, the invention should be construed to include everything within the scope of the appended claims and equivalents thereof.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a coordinator in a communication system, the method comprising:
   receiving Sound Reference Signal (SRS) reception power information of terminals from a scheduler, wherein one or more cells connected to the scheduler determine an SRS reception power from an SRS transmitted by each of the terminals;
   generating terminal distinction information for indicating whether each of the terminals is a cell edge terminal based on the SRS reception power information;
   generating interference relationship information between the terminals and the one or more cells based on the SRS reception power information; and
   transmitting the terminal distinction information and the interference relationship information to the scheduler,
   wherein the SRS reception power information corresponds to power information of one or more SRS which transmit in a same time duration, and
   wherein the interference relationship information is flag information indicating each of the terminals as an interference terminal if the SRS reception power exceeds an interference terminal threshold value.

2. The method of claim 1, further comprising:
   receiving cell edge terminal allocation ratio information from the scheduler;
   generating per-cell cell edge terminal resource allocation pattern information based on the cell edge terminal allocation ratio information; and
   transmitting the per-cell cell edge terminal resource allocation pattern information to the scheduler.

3. The method of claim 2, wherein the scheduler schedules data transmission to the terminals based on the cell edge terminal resource allocation pattern information.

4. The method of claim 3, wherein the scheduler excludes interfering terminals that cause interference to a first cell on time resource allocated to the cell edge terminal of the first cell based on the cell edge terminal resource allocation pattern information.

5. The method of claim 2, further comprising:
   determining a cell edge terminal threshold value based on the SRS reception power information,
   wherein the generating of the terminal distinction information comprises determining, if each of the terminals has an SRS reception power less than the cell edge threshold value less than the cell edge terminal threshold value, each of the terminals as a cell edge terminal.

6. The method of claim 5, wherein the generating of the interference relationship information comprises determining, if the SRS reception power of a terminal to a neighbor cell is greater than the interference terminal threshold value, a relationship between the terminal and the neighbor cell as an interference relationship.

7. An apparatus that coordinates schedulers in a communication system, the apparatus comprising:
   a receiver configured to receive Sound Reference Signal (SRS) reception power information of terminals from a scheduler, wherein one or more cells connected to the scheduler determine an SRS reception power from an SRS transmitted by each of the terminals;
   a processor configured to:
      generate terminal distinction information for indicating whether each of the terminals is a cell edge terminal based on the SRS reception power information, and
      generate interference relationship information between the terminals and the one or more cells based on the SRS reception power; and
   a transmitter configured to transmit the terminal distinction information and the interference relationship information to the scheduler,
   wherein the SRS reception power information corresponds to power information of one or more SRS which transmit in a same time duration, and
   wherein the interference relationship information is flag information indicating each of the terminals as an interference terminal if the SRS reception power exceeds an interference terminal threshold value.

8. The apparatus of claim 7, wherein the receiver is further configured to:
   receive cell edge terminal allocation ratio information from the scheduler,
   generate per-cell cell edge terminal resource allocation pattern information based on the cell edge terminal allocation ratio information, and
   transmit the per-cell cell edge terminal resource allocation pattern information to the scheduler.

9. The apparatus of claim 8, wherein the scheduler is further configured to schedule data transmission to the terminal based on the cell edge terminal resource allocation pattern information.

10. The apparatus of claim 9, wherein the cell edge terminal resource allocation pattern information is used to exclude interfering terminals that cause interference to a first cell on time resource allocated to the cell edge terminal of the first cell based on the cell edge terminal resource allocation pattern information.

11. The apparatus of claim 8, wherein the processor is further configured to:
   determine a cell edge terminal threshold value based on the SRS reception power information, and
   determine, if each of the terminals has an SRS reception power less than the cell edge threshold value less than the cell edge terminal threshold value, each of the terminals as a cell edge terminal.

12. The apparatus of claim 11, wherein the processor is further configured to determine, if the SRS reception power of a terminal to a neighbor cell is greater than the interference terminal threshold value, a relationship between the terminal and the neighbor cell as an interference relationship.

13. A method of operating a Coordinated Multi-Point (CoMP) coordinator in a coordinated communication system, the method comprising:
   receiving Sound Reference Signal (SRS) reception power information from a coordinator of an evolved Node B (eNB), wherein one or more cells determine an SRS reception power from an SRS transmitted by each of the terminals;
   generating terminal distinction information for indicating whether each of the terminals is a cell edge terminal based on the SRS reception power information;
   generating interference relationship information between the terminals and the one or more cells based on the SRS reception power information; and
   transmitting the terminal distinction information and the interference relationship information to the coordinator of the eNB,
   wherein the SRS reception power information corresponds to power information of one or more SRS which transmit in a same time duration, and wherein the interference relationship information is flag information indicating each of the terminals as an interference terminal if the SRS reception power exceeds an interference terminal threshold value.

14. The method of claim 13, further comprising:
receiving cell edge terminal allocation ratio information from the coordinator of the eNB;
generating per-cell cell edge terminal resource allocation pattern information based on the cell edge terminal allocation ratio information; and
transmitting the per-cell cell edge terminal resource allocation pattern information to the coordinator of the eNB.

* * * * *